(12) United States Patent
Hirata et al.

(10) Patent No.: US 9,933,553 B2
(45) Date of Patent: Apr. 3, 2018

(54) OPTICAL ELEMENT AND OPTICAL DEVICE

(75) Inventors: Koji Hirata, Ibaraki (JP); Hiroyuki Minemura, Tokyo (JP); Yumiko Anzai, Tokyo (JP); Tetsuya Nishida, Tokyo (JP); Jiro Yamamoto, Tokyo (JP); Naoyuki Kofuji, Tokyo (JP); Hidehiro Ikeda, Ibaraki (JP); Nobuyuki Kimura, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 467 days.

(21) Appl. No.: 14/403,684

(22) PCT Filed: Jun. 21, 2012

(86) PCT No.: PCT/JP2012/065878
§ 371 (c)(1),
(2), (4) Date: Apr. 28, 2015

(87) PCT Pub. No.: WO2013/190680
PCT Pub. Date: Dec. 27, 2013

(65) Prior Publication Data
US 2015/0226896 A1 Aug. 13, 2015

(51) Int. Cl.
*G02F 1/1335* (2006.01)
*G02B 5/30* (2006.01)
(Continued)

(52) U.S. Cl.
CPC ..... *G02B 5/3058* (2013.01); *G02F 1/133536* (2013.01); *G03B 21/006* (2013.01);
(Continued)

(58) Field of Classification Search
CPC ....... G02B 5/3058; G02F 2001/133548; G02F 1/133536; G03B 21/2073; G03B 21/006
See application file for complete search history.

(56) References Cited

U.S. PATENT DOCUMENTS

| 6,243,199 B1 | 6/2001 | Hansen et al. |
| 2005/0012870 A1* | 1/2005 | Hirata ................. H04N 9/3105 349/8 |

(Continued)

FOREIGN PATENT DOCUMENTS

| CN | 1576986 A | 2/2005 |
| JP | 11-202112 A | 7/1999 |

(Continued)

OTHER PUBLICATIONS

Hitoshi Tamada et al., Al wire-grid polarizer using the s-polarization resonance effect at the 0.-um-wavelength band, Optics Letter, Mar. 15, 1997, pp. 419-421, vol. 22, No. 6.

(Continued)

*Primary Examiner* — Jia Pan
(74) *Attorney, Agent, or Firm* — Baker Botts L.L.P.

(57) ABSTRACT

Provided are an optical element and an optical device using the optical element to which a manufacturing process for manufacturing a wire-grid structure can be basically applied, and besides, in which a higher polarization contrast ratio than that of a wire-grid element can be obtained. A wobbled wire element in an embodiment has a feature that a periodic structure having a period equal to or larger than a wavelength of an incident light wave is formed in a y direction. In this manner, in a wobbled wire element in a first embodiment, a polarization contrast ratio can be significantly improved.

8 Claims, 21 Drawing Sheets

(51) Int. Cl.
    *G03B 21/20*     (2006.01)
    *G03B 21/00*     (2006.01)

(52) U.S. Cl.
    CPC .................. *G03B 21/2073* (2013.01); *G02F 2001/133548* (2013.01)

(56) References Cited

U.S. PATENT DOCUMENTS

| | | | |
|---|---|---|---|
| 2006/0061862 A1* | 3/2006 | Mi | G02B 5/3058 359/485.05 |
| 2008/0117509 A1* | 5/2008 | Hayashi | G02B 5/3058 359/485.05 |
| 2009/0136777 A1 | 5/2009 | Fujii et al. | |
| 2010/0182692 A1* | 7/2010 | Kenmochi | G02B 5/1861 359/485.05 |

FOREIGN PATENT DOCUMENTS

| | | |
|---|---|---|
| JP | 2003-508813 A | 3/2003 |
| JP | 2006-133275 A | 5/2006 |
| JP | 2007-69604 A | 3/2007 |
| JP | 2010-169722 A | 8/2010 |
| JP | 2011-213053 A | 10/2011 |
| WO | 2006/004010 A1 | 1/2006 |
| WO | 2007/138813 A1 | 6/2007 |

OTHER PUBLICATIONS

Office Action, mailed Mar. 25, 2016, which issued during the prosecution of Chinese Patent Application No. 201280073490.7, which corresponds to the present application.

Office Action, mailed May 31, 2016, which issued during the prosecution of Japanese Patent Application No. 2014-521168, which corresponds to the present application.

\* cited by examiner

P-POLARIZED LIGHT

S-POLARIZED LIGHT

FIG. 21
(a) SINE-WAVE SHAPED MODULATION
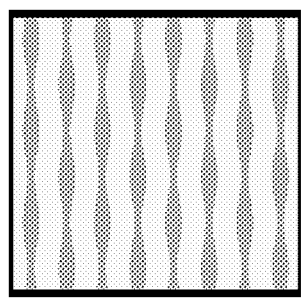
Tp=89.2%
POLARIZED-LIGHT CONTRAST RATIO=3,500
(b) SQUARE-WAVE SHAPED MODULATION
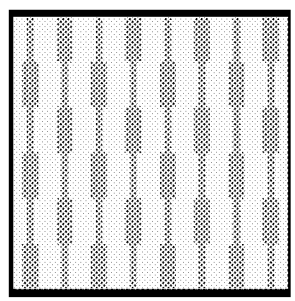
Tp=87.8%
POLARIZED-LIGHT CONTRAST RATIO=8,300
(c) CORNER-ROUNDED SQUARE-WAVE SHAPED MODULATION
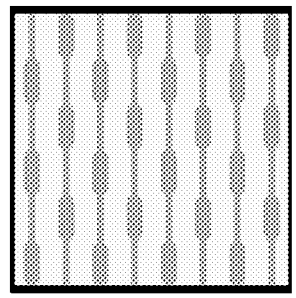
Tp=88.9%
POLARIZED-LIGHT CONTRAST RATIO=4,600

FIG. 22
(a) N = 6/WOBBLED PERIOD
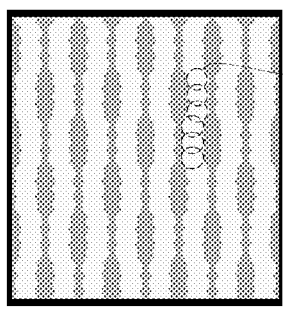
100nmΦ holes
Tp=84.5%
POLARIZED-LIGHT CONTRAST RATIO=27,500
(b) N = 12/WOBBLED PERIOD
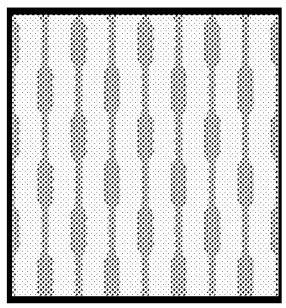
Tp=87.9%
POLARIZED-LIGHT CONTRAST RATIO=6,400
(c) N = 24/WOBBLED PERIOD
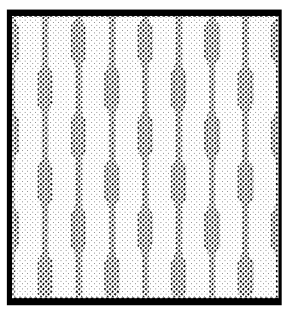
Tp=89.4%
POLARIZED-LIGHT CONTRAST RATIO=4,200

FIG. 25
(a) WIRE-GRID ELEMENT
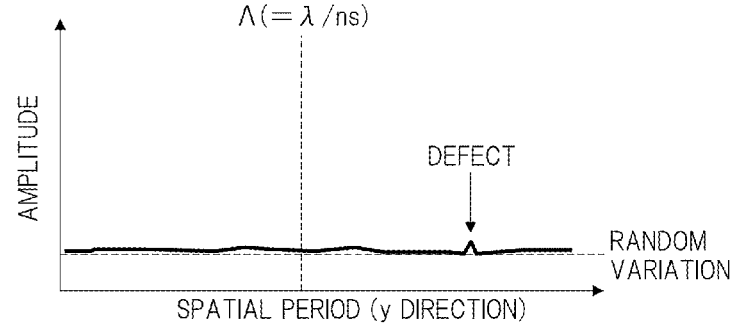
(b) WOBBLED WIRE ELEMENT (Type-I)
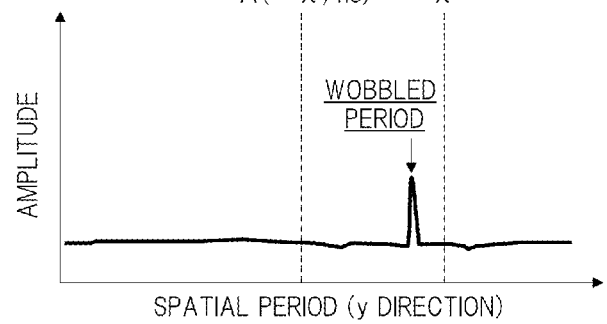
(c) WOBBLED WIRE ELEMENT (Type-II)
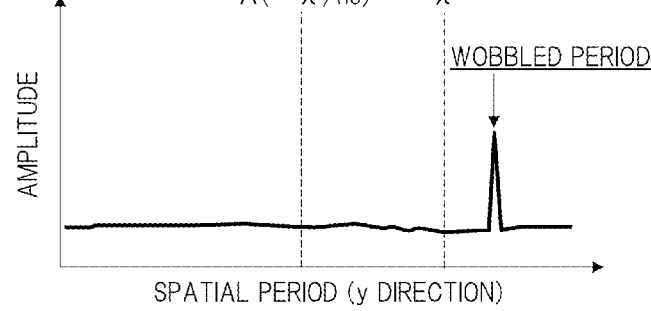

US 9,933,553 B2

OPTICAL ELEMENT AND OPTICAL DEVICE

TECHNICAL FIELD

The present invention relates to an optical element and an optical device.

BACKGROUND ART

Optical devices generally become widespread, and many optical elements for controlling light are used for, for example, a liquid crystal projector, a display, an optical pickup, an optical sensor and others. With the advance of the functions of these devices, highly functional, higher-value added, and lower cost optical devices are also required.

Here, Patent Document 1 and Non-Patent Document 1 describe techniques related to a wire-grid element having a metal wire structure on a transparent substrate.

PRIOR ART DOCUMENTS

Patent Document

Patent Document 1: Japanese Patent Application Laid-Open Publication (Translation of PCT Application) No. 2003-508813 (U.S. Pat. No. 6,243,199)

Non-Patent Document 1: H. Tamada, et al., "Al wire-grid polarizer using the s-polarization resonance", Opt. Lett. 22, 6, pp. 419 to 421 (1997)

SUMMARY OF THE INVENTION

Problems to be Solved by the Invention

A typical example of optical devices is a liquid crystal projector. In this liquid crystal projector, images are displayed by forming an optical image (image light) by a liquid crystal panel modulating a light beam emitted from a light source in accordance with image information and projecting the image light on a screen or others. Since the liquid crystal panel has such a property as modulating an intensity for one polarized light, a polarizer (polarizing element) having a function of selecting polarized light and allowing transmission thereof is arranged on an incident side and an outgoing side of the liquid crystal panel.

In recent years, for downsizing the liquid crystal projector and achieving higher brightness of a projected image, a light density on the liquid crystal panel has been increased, and a polarizing element having excellent heat/light resistance for supporting the increase in light density is desired. For this point, it can be said that a wire-grid element made of, for example, inorganic material is suitable.

In the above-described Non-Patent Document 1, the definition of the wire-grid element is described as follows ("A wire grid is a simple one-dimensional metal grating and is quite promising as a microminiaturized polarization component in the field of integrated optics"). That is, the wire-grid element is a simple one-dimensional (linear) metal grating.

Here, for example, in view of improvement of the image quality of an optical device represented by the liquid crystal projector, improvement in selection performance between a specific polarized light (hereinafter, called "p-polarized light") and a polarized light orthogonal thereto (hereinafter, called "s-polarized light"), namely, the ratio of transmittance, which is one of main performances of a polarizing element, is desired for the polarizing element. When the transmittance of the p-polarized light is represented as Tp while the transmittance of the s-polarized light is represented as Ts in this specification, note that a polarization contrast ratio (Tp/Ts) is used as a performance index of the polarization selectivity. In this case, it can be said that the higher the polarization contrast ratio is, the better the polarization element is in the polarization selectivity.

As described above, the wire-grid element is obtained by arranging a straight metal wire on a transparent substrate at the same period. It is thought that the performance of such a wire-grid element can be changed depending on the period or the shape of the metal wires. However, in the period or the shape of the metal wires, it is difficult to largely change the range of conditions due to limitations of the incident electromagnetic wave or a working process, and therefore, there is a problem of difficulty in significant characteristic improvement (improvement in polarization contrast ratio) on the premise of the structure of the wire-grid element.

That is, even if the polarization contrast ratio of the polarization element is desired to be improved in order to improve the image quality of an optical device, there is a problem of difficulty in improvement of the polarization contrast ratio while the wire-grid structure is maintained.

Accordingly, in view of these circumstances, an object of the present invention is to provide an optical element and an optical device using the same to which the working process for manufacturing a wire-grid structure can be basically applied, and besides, which can achieve a higher polarization contrast ratio than that of the wire-grid element.

Other problems and novel characteristics of the present invention will be apparent from the description of the present specification and the accompanying drawings.

Means for Solving the Problems

An optical element according to one embodiment is provided with (a) a transparent substrate which is transparent for incident electromagnetic wave and (b) a plurality of metal wires formed on a main surface of the transparent substrate and arranged at a first periodic interval in a first direction. At this time, each of the plurality of metal wires extends while having a periodic structure in a second direction orthogonal to the first direction. And, when a wavelength of the electromagnetic wave is assumed to be "$\lambda$," and a refractive index of the transparent substrate is assumed to be "n", a period of the period structure is $\lambda/n$ or larger.

Effects of the Invention

According to one embodiment, performance of the optical element can be improved.

BRIEF DESCRIPTIONS OF THE DRAWINGS

FIG. 14(a) is a case of "a phase difference $\Delta\phi=0$", FIG. 14(b) is a case of "a phase difference $\Delta\phi=\pi/8$", FIG. 14(c) is a case of "a phase difference $\Delta\phi=\pi/4$", and FIG. 14(d) is a case of "a phase difference $\Delta\phi=\pi/2$";

FIG. 21(a) is a diagram showing sine-wave shaped modulation, FIG. 21(b) is a diagram showing square-wave shaped modulation, and FIG. 21(c) is a diagram showing corner-rounded square-wave shaped modulation;

FIG. 22(a) is a diagram showing a wobbled wire element in the case of "N=6", FIG. 22(b) is a diagram showing a wobbled wire element in the case of "N=12", and FIG. 22(c) is a diagram showing a wobbled wire element in the case of "N=24";

Figure 26:
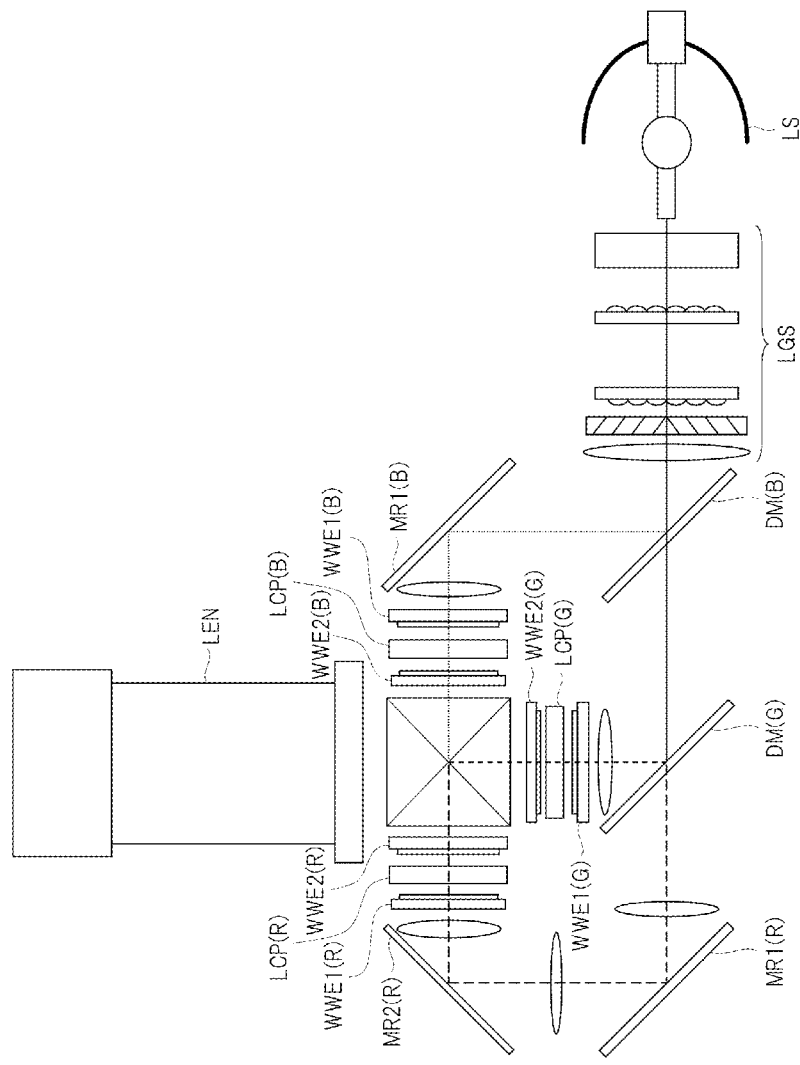

FIG. 25(a) is a diagram showing the spectrum of a conventional wire-grid element in the y direction, FIG. 25(b) is a diagram showing the spectrum of a wobbled wire element (Type-I) in the y direction, and FIG. 25(c) is a diagram showing the spectrum of a wobbled wire element (Type-II) in the y direction; and FIG. 26 is a schematic diagram showing an optical system of a liquid crystal projector in a third embodiment.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and others), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and others are mentioned, the substantially approximate and similar shapes and others are included therein unless otherwise stated or except the case where it is conceivable that they are apparently excluded in principle. The same goes for the value described above and others (including the number of pieces, numerical values, amounts, the range, and others).

Also, the same components are denoted by the same reference symbols throughout the drawings used for the embodiments in principle, and the repetitive description thereof is omitted. Note that hatching is used in some cases even in a plan view so as to make the drawings easy to see.

(First Embodiment)

In a first embodiment, the following explanation will be made in a unified coordinate system taking an "x" axis and a "y" axis in the drawings. Polarized light includes TE (Transverse Electric) polarized light and TM (Transverse Magnetic) polarized light. At this time, the TE polarized light is light having an oscillation component of an electric field in a y direction, while the TM polarized light is light having an oscillation component of the electric field in an x direction. Specifically, for the coordinate system, the explanation will be made in a unified coordinate system taking a direction perpendicular to the substrate as a "z" axis, a longitudinal direction (extension direction) of a metal wire as a "y" axis, and a direction orthogonal to the y axis as an x axis, unless otherwise noted.

In the coordinate system taking the x axis and the z axis in the drawings, the p-polarized light is coincident with the TM polarized light while the s-polarized light is coincident with the TE polarized light. Depending on documents, or depending on coordinate systems, the naming of the p-polarized light and the naming of the s-polarized light are opposite to each other in the first embodiment in some cases. However, in view of a physical mechanism, it is common to have a large transmittance for an optical wave (the p-polarized light in the first embodiment) having an oscillation component of an electrical field in a direction orthogonal to the longitudinal direction of the metal wire.

As a numerical solution method of Maxwell's equations describing an electromagnetic wave, FDTD (Finite Differential Time Domain) method is used.

For the refractive indices of a metal and a semiconductor material, see Handbook of Palik (Palik E. D. (ed.) (1991) Handbook of Optical Constants of Solids II. Academic Press, New York.), unless otherwise noted.

A technical idea in the first embodiment can be widely applied to an electromagnetic wave described by Maxwell's equation. However, particularly in the first embodiment, the explanation will be made by exemplifying light (visible light) which is a type of electromagnetic wave.

<Wire-Grid Element>

Before the explanation for the technical idea in the first embodiment, the wire-grid element will be described first, and then, the technical idea in the first embodiment will be explained.

Figure 1:
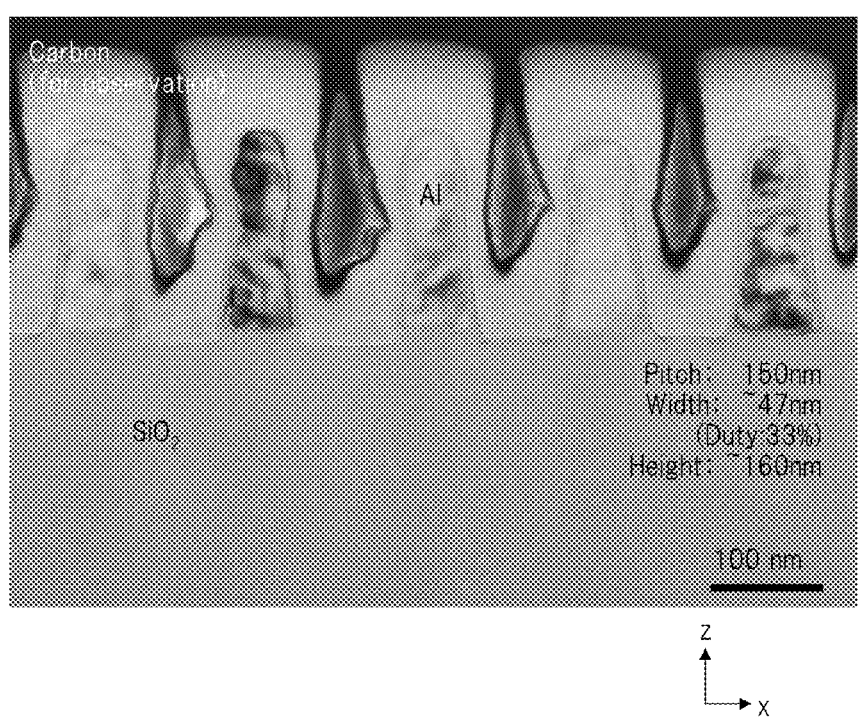
FIG. 1 is a TEM image showing a cross-sectional surface of a prototype wire-grid element.

FIG. 1 is a TEM image showing a cross-sectional surface of a prototype wire-grid element. In FIG. 1, it is found that metal wires made of an aluminum (Al) film are formed on a quartz substrate ($SiO_2$) as a transparent substrate in a wire-grid element. At this time, for example, in FIG. 1, the pitch of the metal wires (x direction) is 150 nm, the width of the metal wires is 47 nm, and the height of the metal wires is 160 nm. Hereinafter, the schematic view of such a wire-grid element is shown, and the function of the wire-grid element as a polarizing element is explained.

Figure 2:
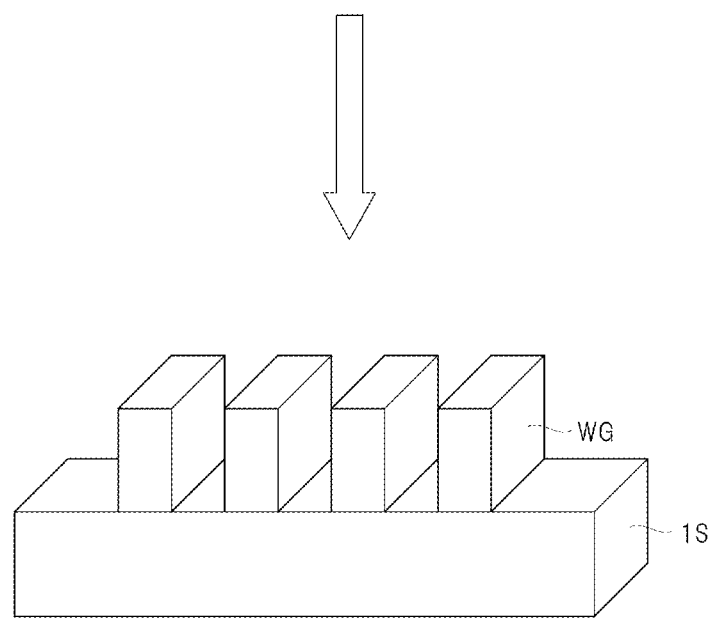
FIG. 2 is a perspective view showing a schematic configuration of a wire-grid element made of a metal thin-wire structure.

FIG. 2 is a perspective view showing a schematic configuration of a wire-grid element made of a metal thin-wire structure. In FIG. 2, in the wire-grid element, a wire-grid (shown as WG in the drawing) formed in concave/convex shape portion having a periodic structure is formed on a transparent substrate 1S made of, for example, a glass substrate, a quartz substrate, or a plastic substrate. Specifically, as shown in FIG. 2, the wire-grid indicates a metal comb-shaped structure made by arranging metal thin wires extending in the y direction at predetermined intervals in the x direction and, in other words, the wire-grid is formed of a concave/convex shape portion obtained by arranging a plurality of metal thin wires periodically at predetermined intervals.

When light (electromagnetic waves) including many rays of polarized light are incident on such a wire-grid element from the top side of FIG. 2 (plus direction of the z axis), the wire-grid element can transmit only polarized light polarized in a specific direction through a lower portion of the substrate 1S. That is, the wire-grid element functions as a polarizing element (polarizer). This mechanism (principle of operation) is briefly explained below with reference to the drawings.

Figure 3:
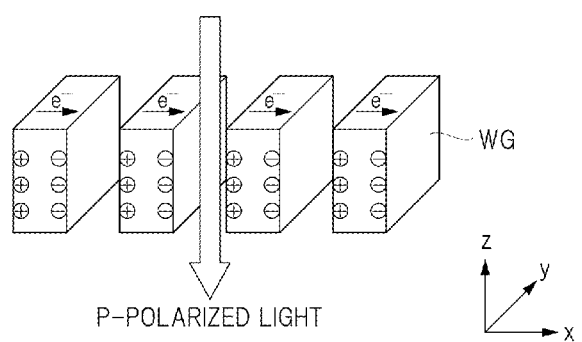
FIG. 3 is a diagram for explaining a mechanism in which p-polarized light (TM polarized light) transmits a wire-grid element.

First, as shown in FIG. 3, when p-polarized light (TM polarized light) in which the oscillation direction of electric field is the x-axis direction is incident, free electrons within the metal thin wires configuring the wire-grid gathers on one side of the metal thin wires in accordance with the oscillation direction of the electric field, so that polarization occurs in each of the metal thin wires. Thus, when the p-polarized light (TM polarized light) is incident, only polarization occurs in the metal thin wires, and therefore, the p-polarized light (TM polarized light) passes through the wire-grid and reaches the transparent substrate 1S. At this time, since the transparent substrate 1S is also transparent to the incident light (electromagnetic wave), the p-polarized light (TM polarized light) is also transmitted through the transparent substrate 1S. As a result, the p-polarized light (TM polarized light) is transmitted through the wire-grid and the transparent substrate 1S.

Figure 4:
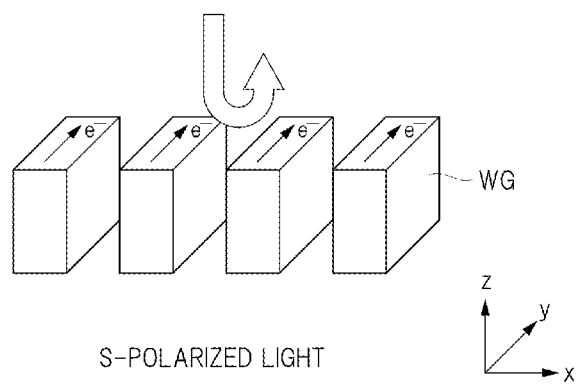
FIG. 4 is a diagram for explaining a mechanism in which s-polarized light (TE polarized light) reflects on the wire-grid element.

On the other hand, as shown in FIG. 4, when the s-polarized light (TE polarized light) in which the oscillation direction of electric field is the y direction is incident, free electrons within the metal thin wires can oscillate in accordance with the oscillation direction of the electric field without being limited by sidewalls of the metal thin wires. This means occurrence of a phenomenon as similar to that of the case of the incident light on a continuous metal film also when the s-polarized light (TE polarized light) is incident on the wire-grid. Therefore, when the s-polarized light (TE polarized light) is incident on the wire-grid, the s-polarized light (TE polarized light) reflects as similar to the case of the incident light on a continuous metal film. At this time, when the thickness of the metal thin wire in the z direction is thicker than a thickness (Skin Depth) allowing the light to enter the metal, the wire-grid has a polarized-light separation function having high separation performance (polarization contrast ratio) which transmits the p-polarized light (TM polarized light) and reflects the s-polarized light (TE polarized light).

From the above description, the wire-grid element has a function that transmits only the polarized light polarized in a specific direction when, for example, light including various polarized light is incident on the wire-grid element. This means that the wire-grid element functions as a polarizing element (polarizer).

Figure 5:
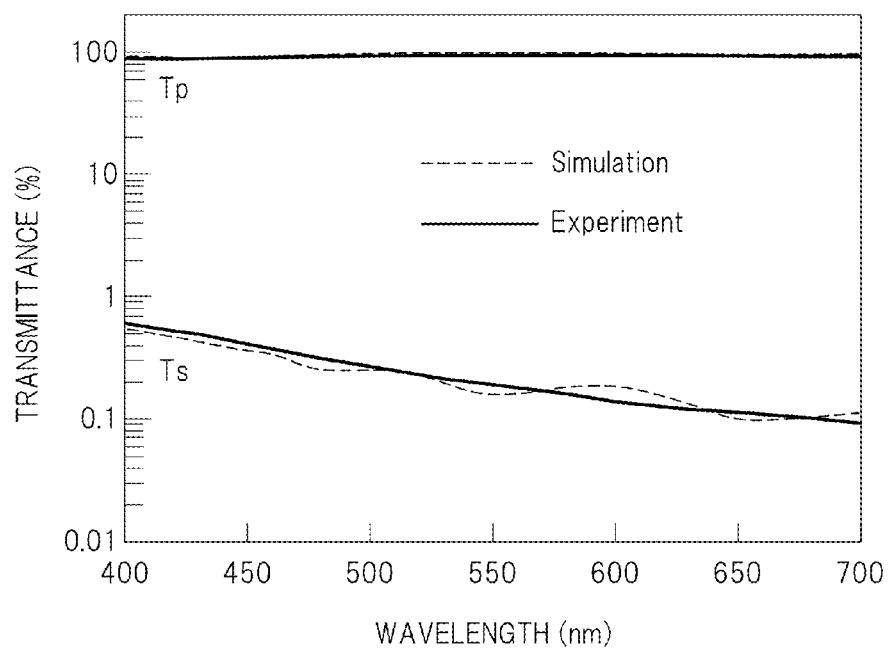
FIG. 5 is a measurement result (experimental result) and a calculation result (simulation result) showing the wavelength dependency of transmittance of the wire-grid element.

Next, FIG. 5 shows a measurement result (experimental result) and a calculation result (simulation result) showing the wavelength dependency of transmittance of a wire-grid element. A spectrophotometer (Model U4100 produced by Hitachi, Ltd.) has been used for measurement of spectral transmittance. Further, two Glan-Taylor prisms produced by Karl Lambrecht Corporation have been used, and each of them is utilized as an analyzer and a polarizer in order to separate the p-polarized light and the s-polarized light to measure the transmittance.

FIG. 5 shows the vertical axis as transmittance (%) while the horizontal axis as the wavelength (nm) of incident light. Note that Tp indicates the transmittance of the p-polarized light while Ts indicates the transmittance of the s-polarized light. At this time, the solid line shows the measurement result while the broken line shows the calculation result.

As seen from FIG. 5, the calculation result is favorably coincident with the measurement result, and the coincidence supports that the calculation method used in the first embodiment is reliable. Unless otherwise noted, in the calculation method used in the first embodiment, a calculation result obtained when an optical wave is incident vertically on the polarizing element is shown for simplifying the explanation.

<New Attention Point Found by the Present Inventors>

The above-described wire-grid element does not have a period structure in the y direction.

Regarding this point, the present inventors have paid attention to a point that a period structure is to be introduced in the y direction that has not been conventionally paid attention to, and also attention to a region where a period in the y direction is Λ or more, and a polarizing element having a polarization contrast ratio that has overcome the limit of the wire-grid element is achieved by introducing a period of Λ or more into the y direction. That is, the present inventors positively have utilized the polarization dependency of an interaction between diffracted light and polarizing element, so that a polarizing element having a high polarization contrast ratio that cannot be achieved by the wire-grid element is achieved. Here, when "$\lambda$" is assumed to be the wavelength of incident light and "$n_s$" is assumed to be the refractive index of the transparent substrate, "$\Lambda$" is a quantity defined as "$=\lambda/n_s$".

This technical idea thought up as a concept by the present inventors will be described below. Here, in the present specification, a region satisfying "$\kappa \le$ the period in the y direction $<\lambda$" is defined as a first region, and a region satisfying "$\lambda \le$ the period in the y direction" is defined as a second region. A polarizing element having a period in the y direction included in the second region is described in the first embodiment while a polarizing element having a period in the y direction included in the first region is described in the second embodiment. Further, a metal wire extending and having a period structure in the y direction is called wobbled wire (denoted by WW in the drawings), and a polarizing element made of the wobbled wire is called wobbled wire element.

<Polarizing Element in the First Embodiment>

First, the polarizing element in the first embodiment will be described below.

Figure 6:
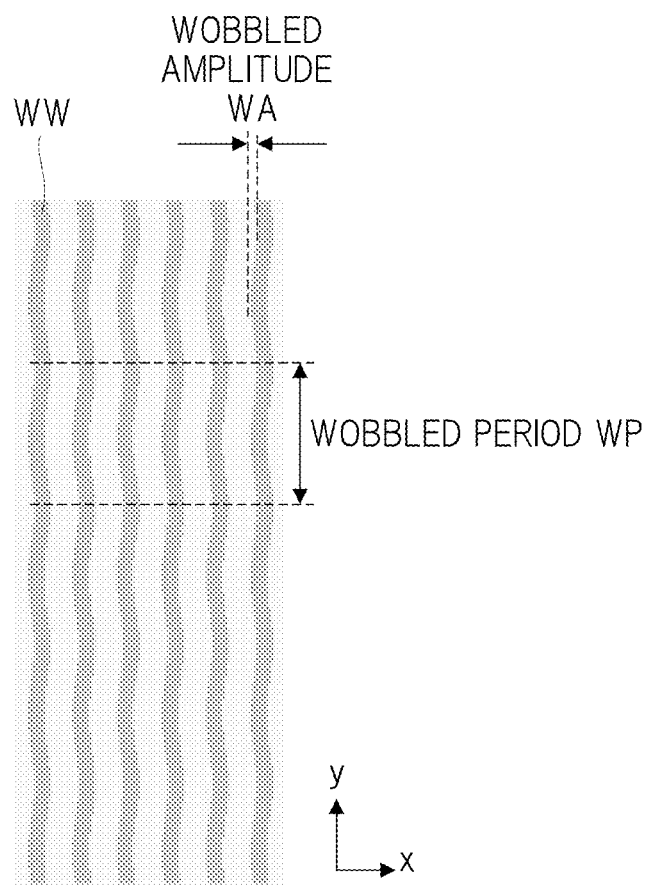
FIG. 6 is a diagram showing a shape pattern of wobbled wires configuring a polarizing element in a first embodiment.

FIG. 6 is an example of a calculation model showing the shape of a metal wire. FIG. 6 shows the shape pattern of wobbled wires constituting the polarizing element in the first embodiment. As shown in FIG. 6, the polarizing element in the first embodiment is defined as having a structure in which a plurality of wobbled wires are arranged at the same interval as each other in the x direction and in which each of the wobbled wires extends having a period structure in the y direction.

A large difference between the wire-grid element and the wobbled wire element is that the wire-grid of the wire-grid element extends linearly without a period structure in the y direction while the wobbled wires of the wobbled wire element extend while having the period structure in the y direction. As described above, in the first embodiment, note that the wire-grid element and the wobbled wire element are distinguished from each other.

FIG. 6 shows a wobbled wire element of the wobbled wire elements described above, the wobbled wire element having each wobbled wire whose width in the x direction is constant and which has a period structure in which the center of the width is modulated periodically in the y direction. Particularly, in FIG. 6, the center of the width in the x direction is modulated into a sine wave shape along the y direction. At this time, as shown in FIG. 6, the modulation period in the y direction is called wobble period WP, and the modulation amplitude is called wobble amplitude WA.

In the wobbled wire element in the first embodiment configured as described above, diffracted light in accordance with the wobble period WP and the wobble amplitude WA described above is generated in the transmitted light and the reflected light. In the wobbled wire element in the first embodiment, the diffracted light is utilized to improve the polarization contrast ratio. This point is described below.

In the calculation result shown below, in order to simplify the description, it is assumed that the wavelength of incident light is $\lambda$=460 nm, and that the material of the wobbled wire is an aluminum film. Unless otherwise noted, a quartz substrate ($n_s$=1.47) is used as the substrate. Further, in order to easily understand discussion for comparison with a conventional wire-gird element, a transmittance Tp and a transmittance Ts mean regular transmittances that are transmittances of light whose diffraction order is zero-th, and the diffracted light means diffracted light whose diffraction order is not zero, namely, ± first order diffracted light, ± second order diffracted light, . . . .

Figure 7:
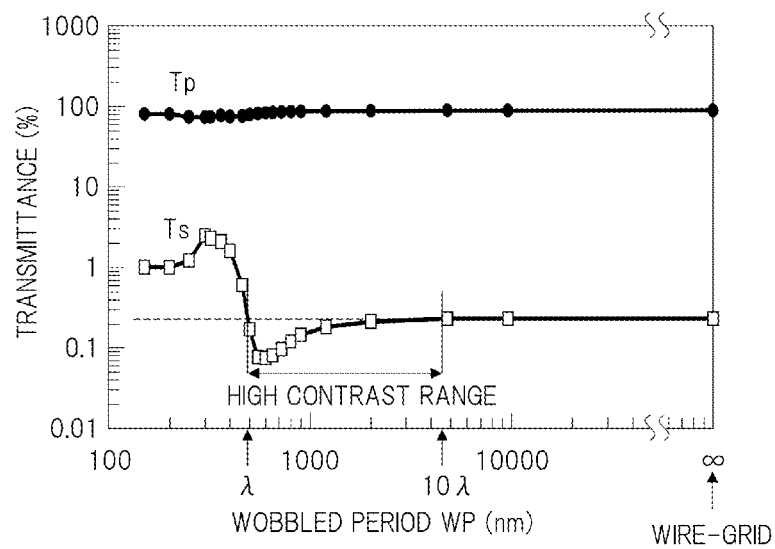
FIG. 7 is a calculation result showing a relation between the wobble period and the transmittance in a wobbled wire element.

FIG. 7 is a calculation result showing a relation between the wobble period WP and the transmittances Ts, Tp in the wobbled wire element shown in FIG. 6. In FIG. 7, the vertical axis indicates the transmittances Tp, Ts (%) while the horizontal axis indicates the wobbled period WP (nm). Here, the wobble amplitude (peak to peak) is 40 nm.

In FIG. 7, the wobbled period "WP=∞" corresponds to the result of a linear wire, namely, the wire-grid element. As shown in FIG. 7, it is found that the transmittance Tp is not significantly changed by the wobble period WP. That is, it can be said that the transmittance Tp is hardly changed between the wobbled wire element and the wire-grid element.

On the other hand, the transmittance Ts remarkably exhibits the dependency on the wobble period WP, and it is found that, when $\lambda$ is the wavelength of incident light, in a range of the wobble period WP of about $\lambda$ to 10$\lambda$, the transmittance Ts of the wobbled wire element is smaller than the transmittance Ts of the wire-grid element.

For this reason, in consideration of the polarization contrast ration (Tp/Ts), the transmittance Tp is almost the same between the wobbled wire element and the wire-grid element, and the transmittance Ts of the wobbled wire element is smaller than the transmittance Ts of the wire-grid element, and therefore, it can be expected that the wobbled wire element can achieve a larger polarization contrast ratio than that of the wire-grid element.

Figure 8:
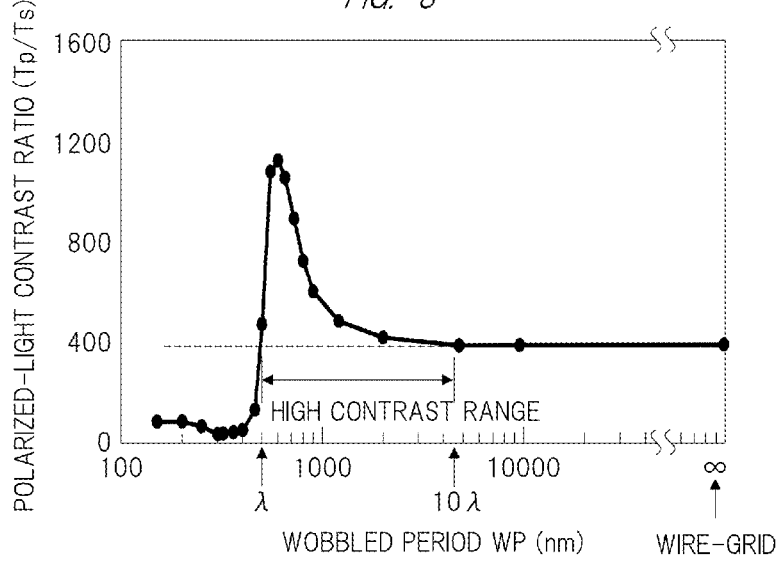
FIG. 8 is a calculation result showing a relation between the wobble period and the polarization contrast ratio in a wobbled wire element.

Next, FIG. 8 is a calculation result showing a relation between the wobble period WP and the polarization contrast ratio (Tp/Ts) in the wobbled wire element shown in FIG. 6. In FIG. 8, the vertical axis indicates the polarization contrast ratio (Tp/Ts) while the horizontal axis indicates the wobble period WP (nm). As shown in FIG. 8, it is found that, when $\lambda$ is the wavelength of incident light, the polarization contrast ratio (Tp/Ts) of the wobbled wire element is larger than the polarization contrast ratio (Tp/Ts) of the wire-grid element in a range of the wobble period WP of about $\lambda$ to 10$\lambda$.

Figure 9:
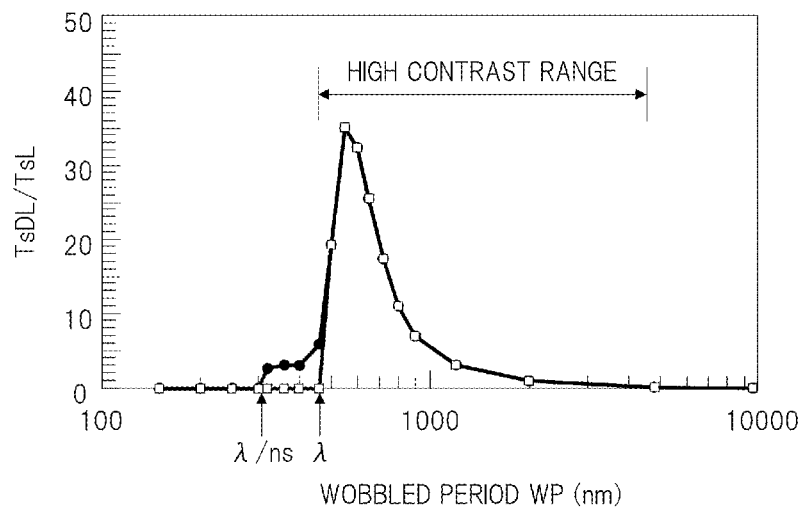
FIG. 9 is a calculation result showing a relation between the wobble period and the magnitude of diffracted light in the wobbled wire element.

Next, FIG. 9 is a calculation result showing a relation between the wobble period WP and the magnitude of the diffracted light in the wobbled wire element shown in FIG. 6. Here, regular transmitted light of the s-polarized light is denoted by TsL, and the sum of transmitted diffracted light of the s-polarized light is denoted by TsDL. The regular transmitted light of transmitted light means transmitted light whose diffraction order is zero, and the transmitted diffracted light of transmitted light means diffracted light whose diffraction order is not zero. Further, in FIG. 9, the vertical axis indicates relative intensity (TsDL/TsL) of the transmitted diffracted light while the horizontal axis indicates the wobble period WP.

As shown in FIG. 9, it is found that the relative intensity (TsDL/TsL) of the transmitted diffracted light becomes large in a high contrast range where the polarization contrast ratio of the wobbled wire element is equal to or more than that of the wire-grid element so that the transmitted diffracted light (TsDL) which is about 35 times the regular transmitted light (TsL) at the maximum is generated. This is a main mechanism to improve the polarization contrast ratio in the wobbled wire element. In this manner, the wobbled wire element has a feature that the polarization contrast ratio is improved by increase in the transmitted diffracted light in the s-polarized light. Regarding this point, a mechanism to improve the polarization contrast ratio by increase in the transmitted diffracted light in the s-polarized light will be described later.

Note that, when λ is the wavelength of incident light, the generated transmitted diffracted light is totally reflected on the back surface of the substrate (a surface on which a wire pattern is not formed) in a range of the wobble period WP in FIG. 9 of $\lambda/n_s$ to λ, and the transmitted diffracted light emitted from the back surface of the substrate is limited within the range of the condition that the wobble period WP is λ or more.

Figure 10:
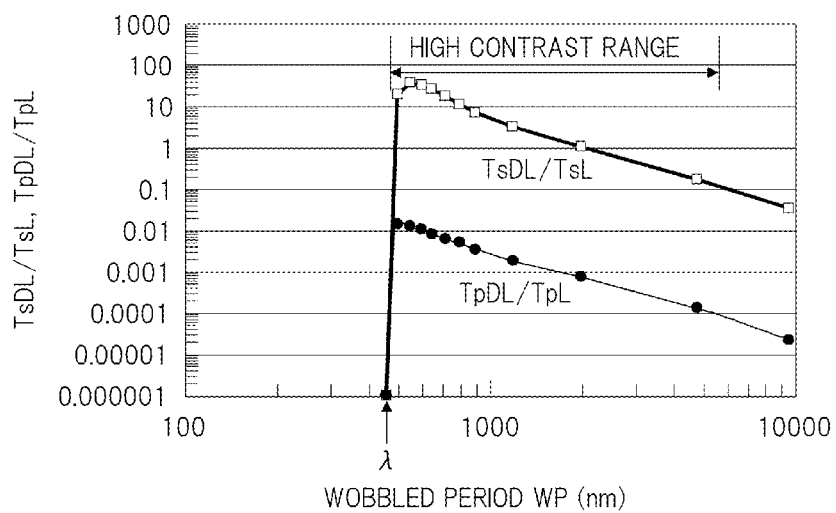
FIG. 10 is a calculation result showing a relation between the wobble period and the magnitude of diffracted light in the wobbled wire element.

Next, FIG. 10 is a calculation result showing a relation between the wobble period WP and the magnitude of the diffracted light in the wobbled wire element shown in FIG. 6. Here, regular transmitted light of the s-polarized light is denoted by TsL, and the sum of the transmitted diffracted light of the s-polarized light is denoted by TsDL. On the other hand, regular transmitted light of the p-polarized light is denoted by TpL, and the sum of the transmitted diffracted light of the p-polarized light is denoted by TpDL. Further, in FIG. 10, the vertical axis indicates the relative intensity (TsDL/TsL, TpDL/TpL) of the transmitted diffracted light while the horizontal axis indicates the wobble period WP.

FIG. 10 shows a comparison between the relative intensity (TsDL/TsL) of the transmitted diffracted light in the s-polarized light and the relative intensity (TpDL/TpL) of the transmitted diffracted light in the p-polarized light, and shows a result of only light emitted from the back surface of the substrate.

As shown in FIG. 10, in a high contrast range where the polarization contrast ratio of the wobbled wire element is equal to or more than the polarization contrast ratio of the wire-grid element, the relative intensity (TsDL/TsL) of the transmitted diffracted light in the s-polarized light is more than 1. On the other hand, the relative intensity (TpDL/TpL) of the transmitted diffracted light in the p-polarized light is about 0.03 at the maximum. Therefore, from FIG. 10, it is found that the transmitted diffracted light generated in the wobbled wire element mainly emerges in the s-polarized light in the high contrast range.

From the above description, on the basis of the calculation results shown in FIGS. 7 to 10, the following matters are derived.

(1) The transmittance Ts of the wobbled wire element becomes smaller than the transmittance Ts of the wire-grid element in a case of almost the same transmittance Tp between the wobbled wired element and the wire-grid element and in a range of the wobble period WP of λ to 10λ (second region) where λ, is the wavelength of incident light. As a result, in a range of the wobble period WP of λ to 10λ, the wobbled wire element can obtain a larger polarization contrast ratio (Tp/Ts) than that of the wire-grid element.

(2) In a high contrast range (a range of λ to 10λ) where the polarization contrast ratio of the wobbled wire element is equal to or more than that of the wire-grid element, the relative intensity (TsDL/TsL) of the transmitted diffracted light in the s-polarized light becomes large. More specifically, in the high contrast range, the relative intensity (TpDL/TpL) of the transmitted diffracted light in the p-polarized light does not become large while the relative intensity (TsDL/TsL) of the transmitted diffracted light in the s-polarized light becomes sufficiently large. That is, in the high contrast range, the transmitted diffracted light generated in the wobbled wire element mainly emerges in the s-polarized light.

From the above-described item (1), the wobbled wire element can obtain a large polarization contrast ratio, and the obtaining of the large polarization contrast ratio is caused by the above-described item (2). That is, in the wobbled wire element in the first embodiment, occurrence of the transmitted diffracted light in the p-polarized light decreases while occurrence of the transmitted diffracted light in the s-polarized light increases in the high contrast range (a range of λ to 10λ). As a result, in the wobbled wire element, the polarization contrast ratio becomes large, and this mechanism is described below.

<Mechanism to Increase the Polarization Contrast Ratio in the First Embodiment>

Figure 11:
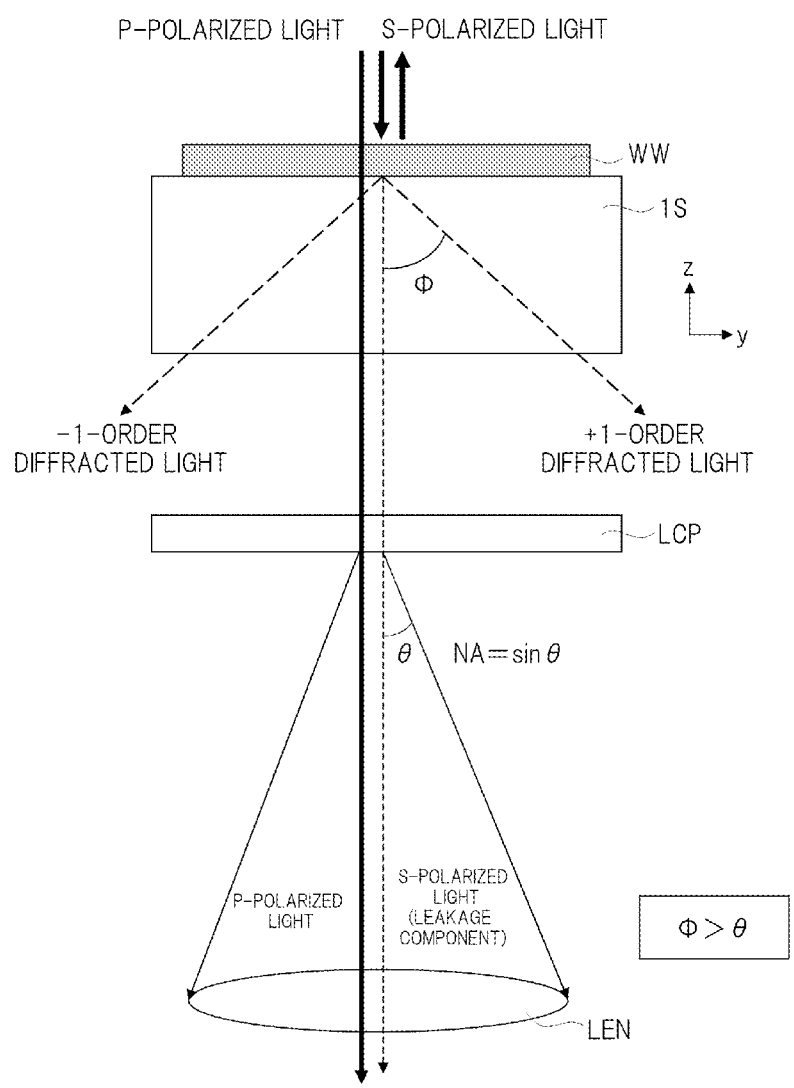
FIG. 11 is a schematic diagram showing a relation between incident light and outgoing light for the wobbled wire element.

FIG. 11 is a schematic view showing a relation between the incident light and the outgoing light in the wobbled wire element shown in FIG. 6. In FIG. 11, note that a y-z plane is shown on a sheet. As shown in FIG. 11, the wobbled wire element has a transparent substrate 1S which is transparent to an incident light wave, and the wobbled wires are formed on a main surface (front surface) of the transparent substrate 1S.

In the wobbled wire element, for example, such a shape pattern of wobbled wires as shown in FIG. 6 is formed. As shown in FIG. 6, the wobbled wire element has a structure in which a plurality of wobbled wires are arranged at the same interval as each other in the x direction, and each of the wobbled wires extends while having a period structure in the y direction.

In the wobbled wire element configured as described above, for example, as shown in FIG. 11, a light wave (a type of electromagnetic wave) is made incident on an upper surface side (main surface side, front surface side) of the wobbled wire element. This light wave includes, for example, p-polarized light and s-polarized light. When such a light wave is made incident on the wobbled wire element, the p-polarized light is transmitted through the wobbled wire element while the s-polarized light is reflected on the front surface of the wobbled wire element.

Ideally, the s-polarized light is desired to be totally reflected thereon. However, practically, the incident s-polarized light is partially transmitted through the wobbled wire element. From this fact, transmitted light transmitted through the wobbled wire element includes not only the p-polarized light but also the s-polarized light.

The smaller a percentage of the s-polarized light included in the transmitted light is, the more the characteristics as the polarizing element are improved. That is, the smaller the s-polarized light included in the transmitted light is, the larger the polarization contrast ratio defined by Tp/Ts is. Therefore, it is found that the characteristics of the wobbled wire element can be evaluated by evaluating the polarization contrast ratio.

Here, in the s-polarized light, by the period structure of the wobbled wire element in the y direction, transmitted diffracted light is generated in the y direction as shown in FIG. 11. Particularly, in the wobbled wire element in the first embodiment, since a period structure having a period of a wave length incident in the y direction or larger than is formed, transmitted diffracted light of the s-polarized light is generated in the y direction. FIG. 11 shows, for example, ±first diffracted light generated in the y direction.

That is, the wobbled wire element in the first embodiment has a feature that a period structure having the period of the incident wave length or larger is formed in the y direction. For this reason, transmitted diffracted light can be generated mainly in the s-polarized light.

Next, as shown in FIG. 11, transmitted diffracted light is generated in the s-polarized light, and, for example, when "L" is the wobble period, "λ" is the wave length of incident light, and "m" is an integer, a diffraction angle φ of the s-polarized light (transmitted diffracted light) transmitted through the back surface of the transparent substrate 1S is expressed by "sin $\phi=m\lambda/L$". Particularly, transmitted diffracted light affecting an optical device is mainly a first diffracted light of "$m=\pm1$".

Here, for example, as shown in FIG. 11, an example is considered, the example in which an intensity of the transmitted light transmitted through the wobbled wire element is modulated by a liquid crystal panel (liquid crystal plate) LCP and is imaged by a lens LEN1. This example is a simplified configuration applied to a genetal liquid crystal projector or others.

In this case, as shown in FIG. 11, the p-polarized light and the s-polarized light (leakage component) which are regular transmitted light transmitted through the wobbled wire element are made incident within a range of NA ($=\sin\theta$) of the lens LEN1, and therefore imaged by the lens LEN1. Meanwhile, when the transmitted diffracted light of the s-polarized light satisfies a condition of "$\theta<\phi(=\lambda/L)$", the transmitted diffracted light of the s-polarized light is not imaged through the lens LEN1. That is, by setting the wobble period L so as to satisfy the condition "$\theta<\phi(=\lambda/L)$", the transmitted diffracted light of the s-polarized light can be excluded from an imaging region. As a result, according to the first embodiment, the percentage of the s-polarized light contributing to imaging can be reduced, so that the polarization contrast ratio is improved.

That is, in the wobbled wire element in the first embodiment, the transmitted leakage component of the s-polarized light is partially made to become transmitted diffracted light, so that the leakage component of the s-polarized light contributing to imaging is substantially reduced. On the other hand, in the p-polarized light, transmitted diffracted light excluded from the imaging region hardly occurs. As a result, the polarization contrast ratio can be improved.

In more detailed explanation, for example, in FIG. 11, the p-polarized light included in the incident light is represented as "100", and the s-polarized light included therein is also represented as "100". Here, first, a conventional wire-grid element is considered. The p-polarized light contributing to imaging from the wire-grid element via the liquid crystal panel LCP and the lens LEN1 is assumed as "90". Meanwhile, when the leakage component of the s-polarized light contributing to imaging from the wire-grid element via the liquid crystal panel LCP and the lens LEN1 is assumed as "10", the polarization contrast ratio when the wire-grid element is used is expressed as "90/10"="9".

On the other hand, the wobbled wire element in the first embodiment is considered. In this case, similarly, the p-polarized light contributing to imaging from the wobbled wire element via the liquid crystal panel LCP and the lens LEN1 is assumed as "90". Meanwhile, although the leakage component of the s-polarized light from the wobbled wire element is assumed as "10", this leakage component partially becomes transmitted diffracted light. When the transmitted diffracted light is assumed as "5", the leakage component of the s-polarized light contributing to imaging from the wobbled wire element via the liquid crystal panel LCP and the lens LEN1 substantially becomes "5". As a result, the polarization contrast ratio when the wobbled wire element in the first embodiment is used becomes "90/5"="18" (>"9").

From the above description, it is found that the polarization contrast ratio can be improved in the usage of the wobbled wire element in the first embodiment more than usage of a conventional wire-grid element. This is the mechanism capable of improving the polarization contrast ratio according to the wobbled wire element in the first embodiment.

<Principle of the First Embodiment>

As described above, the feature of the wobbled wire element in the first embodiment lies in that a period structure having a period of the wave length of the incident light or larger is formed in the y direction.

That is, the present inventors have paid attention to a period structure in the y direction that has not been considered in a conventional wire-grid element at all. That is, for further improvement of the polarization contrast ratio, the leakage component of the s-polarized light not reflected on but transmitted through the wire-grid element is only required to be reduced. However, it is difficult to reduce the leakage component itself of the s-polarized light.

Therefore, the present inventors have paid attention to the improvement of the polarization contrast ratio by not reducing the leakage component itself of the s-polarized light but substantially reducing the leakage component of the s-polarized light included within the range of numerical aperture (NA) of a lens by generating diffracted light in the leakage component of the s-polarized light. This attention point is unconventional, and the present inventors have realized this conception and thought up a wobbled wire element having a period structure of the wave length of incident light or larger in the y direction.

That is, if a period structure of the wave length of incident light or larger in the y direction is formed, transmitted diffracted light can be generated in the s-polarized light, so that the leakage component of the s-polarized light contributing to imaging can be reduced. As a result, in the wobbled wire element in the first embodiment, the polarization contrast ratio can be significantly improved.

Note that it is required to set the period of the period structure in the y direction to be the wave length of incident light or larger in order to generate transmitted diffracted light in the s-polarized light. However, if the period is too larger than the wave length of incident light, the polarization contrast ratio cannot be improved. This is because, when the period of the period structure in the y direction is too large, the diffraction angle becomes small, and even diffracted light is included within the range of numerical aperture of the lens. Therefore, as also described in the first embodiment, for example, if the period of the period structure in the y direction is about equal to or larger than $\lambda$ and equal to or smaller than $10\lambda$, the polarization contrast ratio can be significantly improved.

In the above-described manner, according to the wobbled wire element in the first embodiment, a larger polarization contrast ratio than that of the wire-grid element can be obtained by developing the polarization dependency of diffracted light due to the period structure in the y direction. Therefore, the image quality of an optical device represented by, for example, a liquid crystal projector on which this wobbled wire element is mounted can be improved.

Further, this wobbled wire element can be manufactured through the use of the semiconductor processing technique as similar to a conventional wire-grid element. Particularly, the manufacturing process of the wobbled wire element has such an advantage as being easily manufactured since it is only required to change the process of patterning a metal wire in the manufacturing process of a conventional wire-grid element and other manufacturing processes can be utilized.

<Modification Example>

Figure 12:
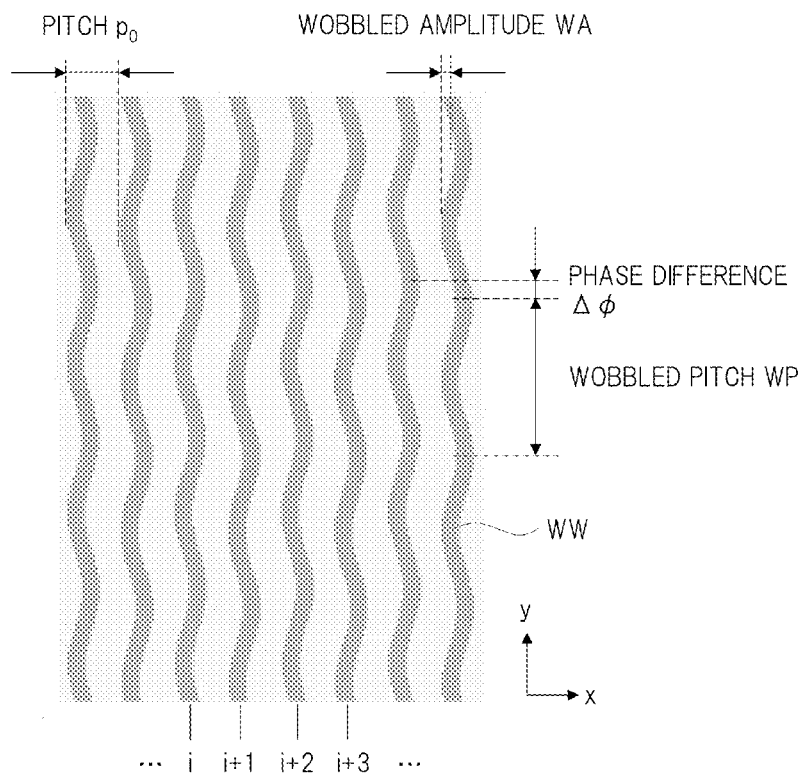
FIG. 12 is a schematic diagram showing the configuration of the wobbled wire element when two adjacent wobbled wires have different phases from each other in the longitudinal direction.

FIG. 12 is a schematic view showing the configuration of a wobbled wire element when two adjacent wobbled wires have different phases from each other in the longitudinal direction (y direction). As shown in FIG. 12, when the number of a wobbled wire is "i", the pitch in the x direction is "$p_0$", the wobble period WP is "L", the wobble amplitude WA is "A", the phase in the y direction is "$\phi_i$", and the wavenumber "$k_y=2\pi/L$", the x coordinate (xc) at the center of an i-th wobbled wire is expressed as the follows (in Expression 1).

$$x_c = p_0 \cdot i + (A/2) \times \sin(k_y y + \phi_i) \quad \text{(Expression 1)}$$

If $\phi_i=0$, then i is an even number, and

If $\phi_i=\Delta\phi$, then i is an odd number.

Here, $\Delta\phi$ is a phase difference in the y direction between the adjacent wobbled wires.

Figure 13:
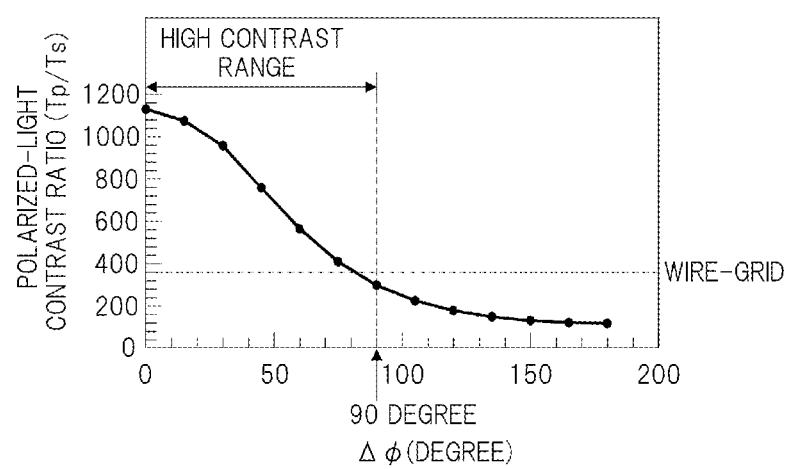
FIG. 13 is a calculation result showing a relation between the polarization contrast ratio and the phase difference between the adjacent wobbled wires in a "y" direction in the wobbled wire element.

FIG. 13 is a calculation result showing a relation between the phase difference $\Delta\phi$ in the y direction between adjacent wobbled wires and the polarization contrast ratio (Tp/Ts) in the wobbled wire element shown in FIG. 12. In FIG. 13, the vertical axis indicates the polarization contrast ratio (Tp/Ts) while the horizontal axis indicates the phase difference $\Delta\phi$ (degree). Note that the wobble period is set at 600 nm.

As shown in FIG. 13, in the wobbled wire element in this modification example, it is found that a polarization contrast ratio equal to or larger than that of a conventional wire-grid element can be obtained when the phase difference $\Delta\phi$ is almost 90 degrees ($=\pi/4$) or smaller. It is also found that the polarization contrast ratio improves more as the phase difference $\Delta\phi$ is smaller. Therefore, the polarization contrast ratio can be most improved when the phase difference $\Delta\phi$ in the y direction between adjacent two wobbled wires is 0 degrees. However, as shown in FIG. 13, if the phase difference $\Delta\phi$ is 90 degrees or smaller, the polarization contrast ratio can be improved more than a conventional wire-grid element.

For example, if $\Delta\phi=0$, in the wobbled wire element in this modification example, a maximum polarization contrast ratio can be obtained. Specifically, this maximum value is 1130, and, according to this wobbled wire element, a polarization contrast ratio which is about three times the polarization contrast ratio (380) of the wire-grid element under the same conditions can be obtained.

Figure 14:
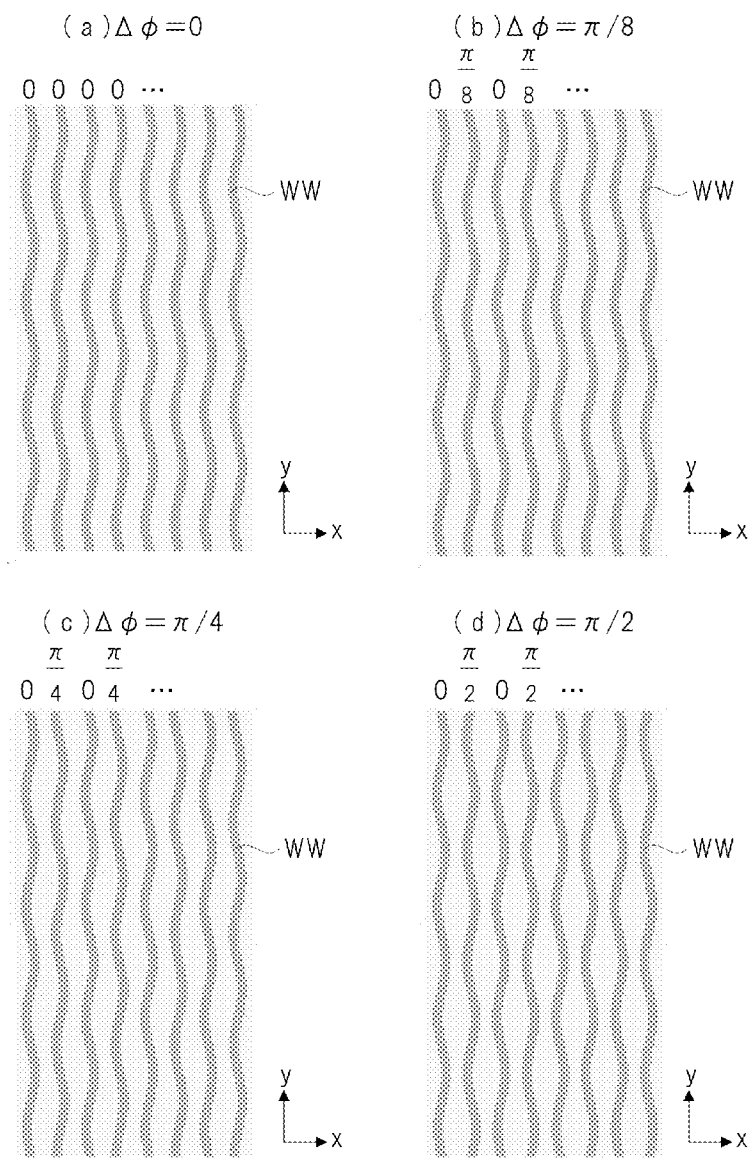
FIG. 14 is a diagram schematically showing a pattern of a wobbled wire.

FIG. 14 is a diagram schematically showing patterns of the wobbled wires regarding four types of cases with different phase differences $\Delta\phi$ in the y direction. FIG. 14(a) shows the case of the phase differences $\Delta\phi=0$, and FIG. 14(b) shows the case of the phase differences $\Delta\phi=\pi/8$. Similarly, FIG. 14(c) shows the case of the phase differences $\Delta\phi=\pi/4$, and FIG. 14(d) shows the case of the phase differences $\Delta\phi=\pi/2$.

Also in the wobbled wire elements in this modification example shown in FIGS. 14(a) to 14(d), a wobbled wire element having characteristics suitable for application can be manufactured by calculating, for example, the angle of diffracted light, the intensity of diffracted light, the transmittance (Tp) of the p-polarized light, and the transmittance (Ts) of the s-polarized light by using the FDTD method.

Figure 15:
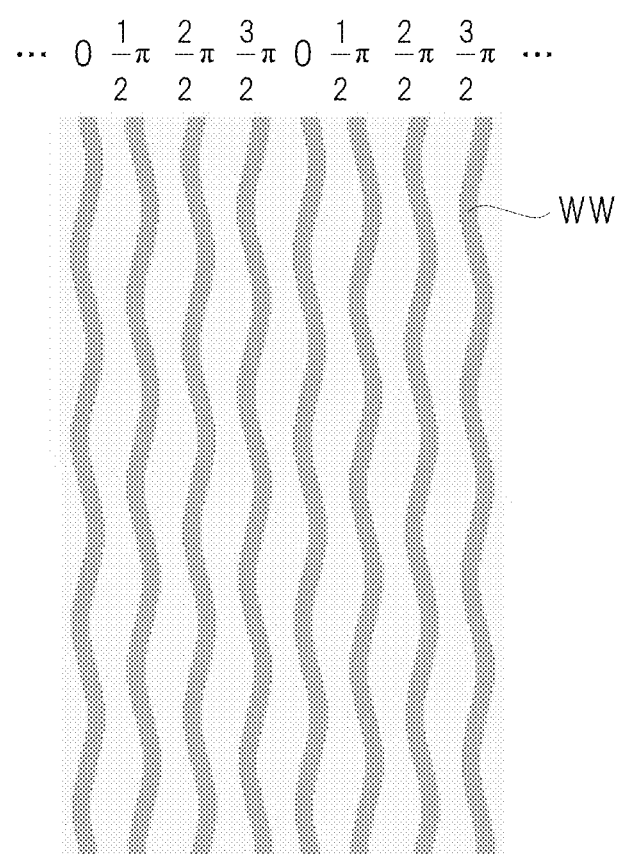
FIG. 15 is a schematic diagram showing the configuration of a wobbled wire element when phase differences among four adjacent wobbled wires in the y direction increases by $\pi/2$.

FIG. 15 is a schematic diagram showing the configuration of a wobbled wire element when the phase differences $\Delta\phi$ in the y direction among four adjacent wobbled wires increase by $\pi/2$ from one another. In the wobbled wire element shown in FIG. 15, four wobbled wires configure one period in the x direction. In this case, the shape of the wobbled wire element is complicated. However, also in this case, the polarization contrast ratio can be improved.

(Second Embodiment)

In the first embodiment, the wobbled wire element has been described, the wobbled wire element having the metal wire with the constant width in the x direction in which the center of the width in the x direction is periodically modulated and in which this modulation period is included in the second region (2<modulation period). Further, in the first embodiment, it has been described that the wobbled wire element configured as described above can obtain a polarization contrast ratio larger than that of a conventional wire-grid element within the range of such a condition as increasing the diffracted light in the s-polarized light transmitted through the transparent substrate, namely, within a range of the wobble period of about $\lambda$ to $10\lambda$.

Particularly, the wobbled wire element in the first embodiment is effective when such a condition as increasing the diffraction angle of the transmitted diffracted light of the s-polarized light to be larger than the numerical aperture of the lens LEN1 is satisfied as shown in FIG. 11.

In this case, there is the risk that multiple reflection of the transmitted diffracted light of the s-polarized light occurs in an optical device to form stray light. That is, for example, when the wobbled wire element in the first embodiment is applied to a head unit of an optical disk, a receiver for optical communication, or others, the risk of degradation of signal quality due to the above-described stray light is considered.

Therefore, in the second embodiment, a wobbled wire element having a modulated width of a metal wire in the x direction is described. Specifically, the following is the explanation for achievement of a high polarization contrast ratio without generating the transmitted diffracted light according to the wobbled wire element in the second embodiment configured as described above.

Note that the wobbled wire element in the second embodiment is a wobbled wire element whose modulation period extending along the y direction having the width in the x direction is included in a first region ($\Lambda \leq$ the modulation period $\leq \lambda$).

<Polarizing Element in the Second Embodiment>

Figure 16:
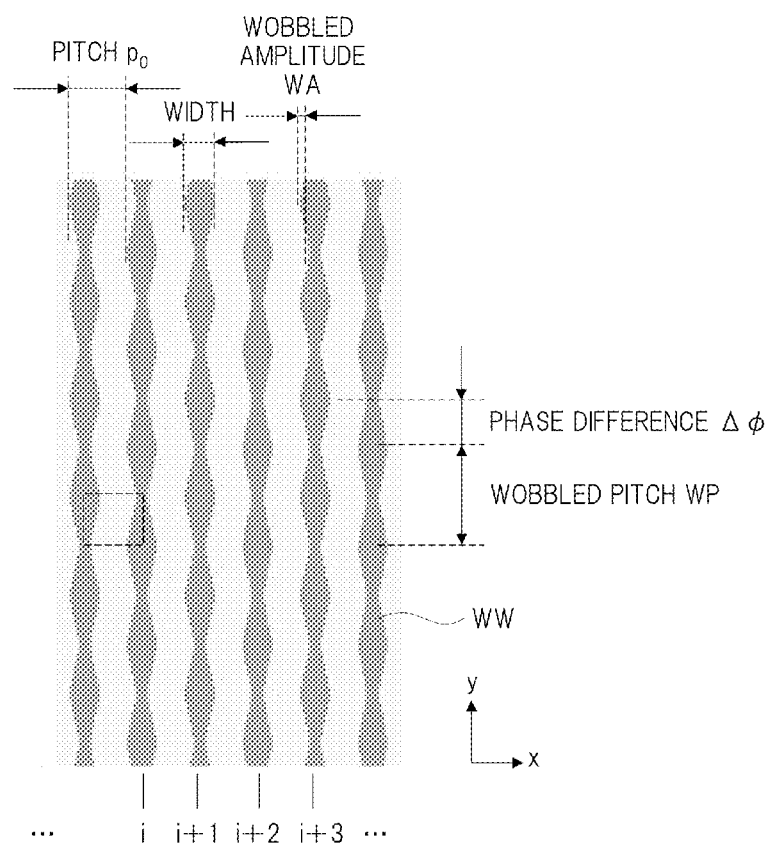
FIG. 16 is a schematic diagram showing the configuration of a wobbled wire element in a second embodiment.

FIG. 16 is a schematic diagram showing the configuration of the wobbled wire element of the second embodiment. As shown in FIG. 16, the wobbled wire element in the second embodiment is a polarizing element in which a width of the wobbled wire in the x direction is modulated. That is, the wobbled wire element in the second embodiment has a structure in which the center position of the width in the x direction is constant, and the width in the x direction is periodically modulated.

As shown in FIG. 16, when the number of a wobbled wire is "I", the average width of the wobbled wire in the x direction is "$w_0$", the wobble period WP is "L", the wobble amplitude WA is "A/2", the phase in the y direction is "$\phi_i$", and the wavenumber "$k_y=2\pi/L$", the width "wi" of an i-th wobbled wire is expressed as follows (in Expression 2).

$$W_i = w_0 + (A/2) \times \sin(k_y y + \phi_i) \quad \text{(Expression 2)}$$

If $\phi_i=0$, then i is an even number,

If $\phi_i=\Delta\phi$, then i is an odd number.

Here, $\Delta\phi$ is a phase difference in the y direction between adjacent wobbled wires. FIG. 16 shows the case of "$\Delta\phi=\pi$". For example, when the width of the wobbled wire in the x direction is constant as similar to the first embodiment, the polarization contrast ratio has been maximized in the case of "$\Delta\phi=0$", that is, in a case in which a space (gap) between adjacent wobbled wires in the x direction is constant (see FIG. 13).

Therefore, also in the second embodiment, it is considered that the polarization contrast ratio is improved by causing the space (gap) between adjacent wobbled wires in the x direction to be constant when the width of the wobbled wire in the x direction is modulated. From this point of view, as shown in FIG. 16, in the second embodiment, when the width of the wobbled wire in the x direction is modulated, a relation "Δφ=π" is established so that the space (gap) between adjacent wobbled wires in the x direction becomes constant.

Figure 17:
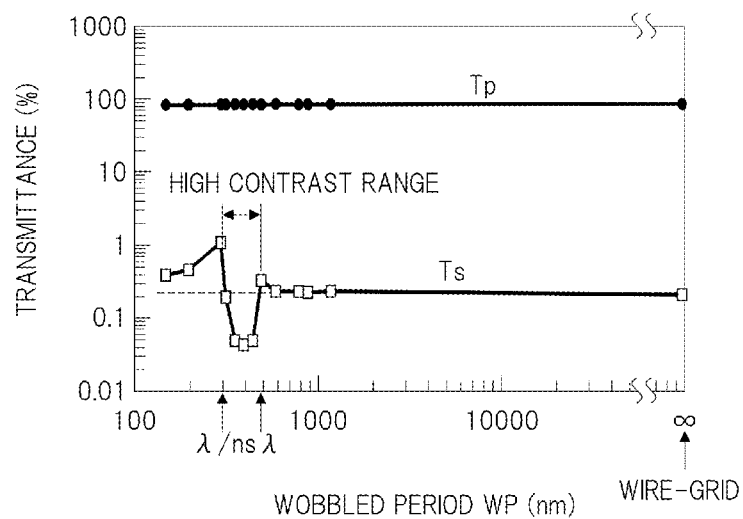
FIG. 17 is a calculation result of a relation between the wobble period and the transmittance of p-polarized light and a relation between the wobble period and the transmittance of s-polarized light in the wobbled wire element.

FIG. 17 is a calculation result showing a relation between the wobble period WP and the transmittance Tp of the p-polarized light and a relation between the wobble period WP and the transmittance Ts of the s-polarized light in the wobbled wire element shown in FIG. 16. Here, the wobble amplitude (peak to peak) is 40 nm. In FIG. 17, note that the wobble period "WP=∞" indicates a result of a linear wire. In FIG. 17, the vertical axis indicates the transmittance Tp or the transmittance is while the horizontal axis indicates the wobble period WP (nm).

As shown in FIG. 17, the transmittance Tp of the p-polarized light exhibits no remarkable dependency on the wobble period WP. On the other hand, the transmittance Ts of the s-olarized light exhibits remarkable dependency on the wobble period WP, and it is found that the transmittance Ts of the s-polarized light is smaller than the transmittance of the wire-grid element in a range of the wobble period WP of about $\lambda/n_s$ to $\lambda$ (in the first region) when the refractive index of the transparent substrate is "$n_s$" and the wave length of incident light is "$\lambda$".

Figure 18:
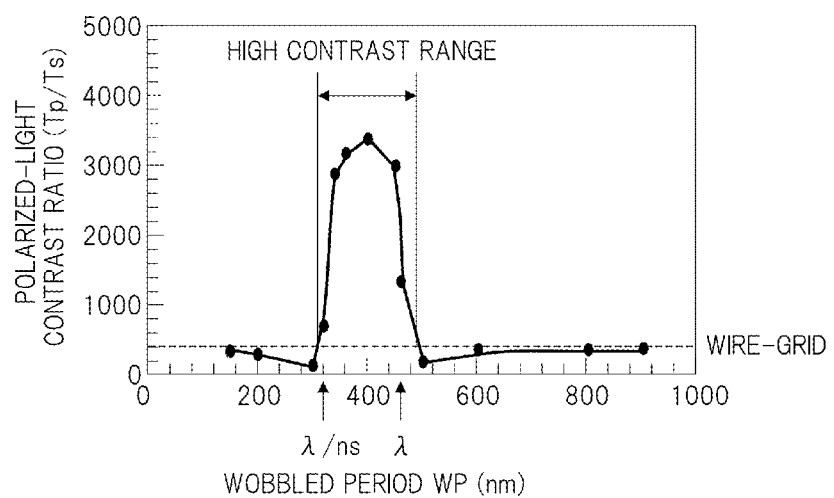
FIG. 18 is a calculation result showing a relation between the wobble period and the polarization contrast ratio in a wobbled wire element.

Next, FIG. 18 is a calculation result showing a relation between the wobble period WP and the polarization contrast ratio (Tp/Ts) in the wobbled wire element shown in FIG. 16. In FIG. 18, the vertical axis indicates the polarization contrast ratio (Tp/Ts) while the horizontal axis indicates the wobble period WP (nm).

As shown in FIG. 18, when the wave length of incident light is $\lambda$, a larger polarization contrast ratio than that of the wire-grid element under the same conditions can be obtained in a range of the wobble period WP of about $\lambda/n_s$ to $\lambda$ (in the first region). Specifically, in the wobbled wire element in the second embodiment, it is found that a maximum value of the polarization contrast ratio (Tp/Ts) is 3500 so that the polarization contrast ratio (Tp/Ts) which is close to ten times a polarization contrast ratio of a conventional wire-grid element can be obtained.

Figure 19:
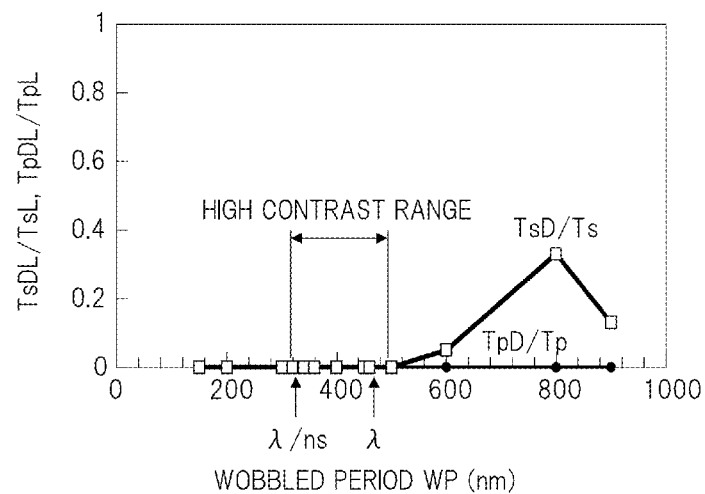
FIG. 19 is a calculation result showing a relation between the wobble period and the magnitude of transmitted diffracted light in the wobbled wire element.

Next, FIG. 19 is a calculation result showing a relation between the wobble period WP and the magnitude of the transmitted diffracted light in the wobbled wire element shown in FIG. 16. In FIG. 19, the sum of transmitted diffracted light of the p-polarized light is indicated by "TpDL", and the relative value with respect to regular transmitted light TpL of the p-polarized light is indicated by (TpDL/TpL). Similarly, the sum of transmitted diffracted light of the s-polarized light is indicated by "TsDL", and the relative value with respect to regular transmitted light TsL of the s-polarized light is indicated by (TsDL/TsL).

Here, in FIG. 19, the vertical axis indicates the relative value (TpDL/TpL) of the transmitted diffracted light (TpDL) with respect to the regular transmitted light TpL in the p-polarized light and the relative value (TsDL/TsL) of the transmitted diffracted light (TsDL) with respect to the regular transmitted light TsL in the s-polarized light. Meanwhile, the horizontal axis indicates the wobble period WP (nm).

As shown in FIG. 19, regarding the transmitted light, it is found that the transmitted diffracted light of the p-polarized light is not generated within an error range of calculation. Further, as easily understood from comparison with FIG. 9 showing the first embodiment, in the wobbled wire element in the second embodiment, occurrence of the transmitted diffracted light is less also in the s-polarized light. Therefore, in the wobbled wire element in the second embodiment, it is found that influence of the transmitted diffracted light can be ignored in both of the p-polarized light and the s-polarized light in the range of the condition of the large polarization contrast ratio (Tp/Ts) (high contrast range).

From the above description, on the basis of the calculation results shown in FIGS. 17 to 19, the following matters are derived.

(3) In a range (first region) where the wobbled wire element and the wire-grid element have almost the same transmittance Tp and where the wobble period WP is $\lambda/n_s$ to $\lambda$, the transmittance Ts of the wobbled wire element becomes smaller than the transmittance Ts of the wire-grid element. As a result, in a range where the wobble period WP is $\lambda/n_s$ to $\lambda$, the wobbled wire element can obtain a larger polarization contrast ratio (Tp/Ts) than that of the wire-grid element.

(4) In a high contrast ratio where the polarization contrast ratio of the wobbled wire element is equal to or larger than that of the wire-grid element (in a range of $\lambda/n_s$ to $\lambda$), both magnitudes of the transmitted diffracted light in the p-polarized light and the transmitted diffracted light in the s-polarized light become small. That is, in the second embodiment, in the range of the condition that the polarization contrast ratio (Tp/Ts) becomes large (in a range of the wobble period WP of $\lambda/n_s$ to $\lambda$), the influence of transmitted diffracted lights of both of the p-polarized light and the s-polarized light can be ignored.

For the reason of the above-described matter (3), in the wobbled wire element in the second embodiment, a large polarization contrast ratio can be obtained. However, since the above-described matter (4) is different from the matter (2) described above in the first embodiment, it is deduced that the large polarization contrast ratio is obtained in the wobbled wire element in the second embodiment by a different mechanism from the mechanism described in the first embodiment. That is, in the wobbled wire element in the second embodiment, a mechanism to obtain a large polarization contrast ratio (Tp/Ts) in the high contrast range (a range of $\lambda/n_s$ to $\lambda$) is deduced as follows. This mechanism is described below.

<Mechanism to Increase the Polarization Contrast Ratio in the Second Embodiment>

The wobbled wire element in the second embodiment also has a period structure in the y direction. Specifically, as shown in FIG. 16, in the wobbled wire element in the second embodiment, the width of the wobbled wire in the x direction is modulated along the y direction. The period of the period structure formed along the y direction is included in a range of $\lambda/n$ to $\lambda$. Here, as the condition to generate diffracted light, the period of $\lambda$ or larger is required. However, particularly in consideration within the transparent substrate, when the refractive index of the transparent substrate is "$n_s$", an effective wavelength of a light wave passing through the transparent substrate is $\lambda/n_s$. Therefore, as such a condition as generating the transmitted diffracted light within the transparent substrate, it is only required that the period is, $\lambda/n_s$ or larger.

Here, in the wobbled wire element in the second embodiment, it is though that the diffracted light is generated in the s-polarized light passing through the transparent substrate since the period of the period structure in the y direction is within a range of $\lambda/n$ to $\lambda$. That is, also in the second embodiment, it is thought that the transmitted diffracted light of the s-polarized light is generated within the transparent substrate.

However, in a practical calculation result, for example, as shown in FIG. 19, the magnitude of transmitted diffracted light of the s-polarized light is small. It is considered that this is because of the following reason. That is, in the wobbled wire element in the second embodiment, as shown in FIG. 16, phases are shifted between adjacent wobbled wires. Particularly, in FIG. 16, a phase difference between adjacent wobbled wires is $\pi$ (=180 degrees).

For this reason, for example, a phase difference between diffracted light due to a predetermined wobbled wire and diffracted light due to a wobbled wire adjacent to the predetermined wobbled wire is shifted by $\pi$ (=180 degrees), the diffracted light rays are cancelled by each other when being superimposed on each other. That is, while the transmitted diffracted light of the s-polarized light is practically generated within the transparent substrate, behaviors of the diffracted light rays are as if they apparently do not exist because they are cancelled by each other. Therefore, even if the s-polarized light that has reached the inside of the transparent substrate is partially cancelled, the s-polarized light is still dispersed as the transmitted diffracted light, and, as a result, the intensity of the s-polarized light (regular transmitted light) transmitted through the transparent substrate and then leaked becomes small. As a result, according to the wobbled wire element in the second embodiment, the polarization contrast ratio can be improved.

Further, from another point of view, in the second embodiment, the reason why the polarization contrast ratio is improved can be also explained as follows. That is, the wobbled wire element in the second embodiment is in the condition that Rayleigh resonance and generation of diffracted light simultaneously occur since the period of the period structure in the y direction is within a range of $\lambda/n_s$ to $\lambda$. Further, under this condition, Rayleigh resonance and the generation of diffracted light are suppressed by the phase shift (for example, $\pi$) between two adjacent wobbled wires in the y direction. In this manner, it can also be considered that this is because optical energy that should be distributed to diffracted light is consequently replaced with absorption and reflection. In this manner, the intensity of the s-polarized light (regular transmitted light) transmitted through the transparent substrate and then leaked becomes small. Therefore, according to the wobbled wire element in the second embodiment, the polarization contrast ratio can be improved.

For the above-described reason, it is found that the polarization contrast ratio can be improved in the case of using the wobbled wire element in the second embodiment more than the case of using a conventional wire-grid element. This is the mechanism capable of improving the polarization contrast ratio according to the wobbled wire element in the second embodiment.

<Principle of the Second Embodiment>

As described above, the feature of the wobbled wire element in the second embodiment lies in that a period structure having a period which is equal to or larger than "wavelength/refractive index" (transparent substrate) of incident light and which is smaller than the wavelength of the incident light is formed in the y direction.

That is, the present inventors have paid attention to a period structure in the y direction that has not been considered in a conventional wire-grid element at all. That is, for further improvement of the polarization contrast ratio, the leakage component of the s-polarized light not reflected on but transmitted through the wire-grid element is only required to be reduced. However, it is difficult to reduce the leakage component itself of the s-polarized light.

Therefore, the present inventors have paid attention to the improvement of the polarization contrast ratio by not reducing the leakage component itself of the s-polarized light but substantially reducing the leakage component of the s-polarized light by generating the transmitted diffracted light of the s-polarized light within the transparent substrate.

Particularly, in the wobbled wire element in the second embodiment, the period of the period structure in the y direction is set to be included within a range of $\lambda/n_s$ to $\lambda$. In this manner, transmitted diffracted light can be generated within the transparent substrate, and besides, the range of the condition of $\lambda/n_s$ to $\lambda$ is almost coincide with the range of the condition that the transmitted diffracted light which has passed through the transparent substrate is totally reflected on the bask surface of the transparent substrate.

Also for this reason, the transmitted diffracted light generated within the transparent substrate can be prevented from leaking outside the transparent substrate. As a result, according to the wobbled wire element in the second embodiment, the transmitted diffracted light of the s-polarized light generated within the transparent substrate is suppressed from leaking outside the transparent substrate and becoming stray light.

Further, in the second embodiment, the phase difference in the y direction between adjacent wobbled wires configuring the wobbled wire element is set to $\pi$ (=180 degrees), so that the transmitted diffracted light of the s-polarized light is cancelled so as not to leak outside the transparent substrate while the transparent diffracted light of the s-polarized light is generated within the transparent substrate.

For the above-described reason, according to the wobbled wire element in the second embodiment, the s-polarized light (regular transmitted light) passing through the transparent substrate is partially dispersed as transmitted diffracted light, so that the intensity of the s-polarized light (regular transmitted light) transmitted and leaked from the transparent substrate can be small. Therefore, according to the wobbled wire element in the second embodiment, the polarization contrast ratio can be improved.

Further, according to the wobbled wire element in the second embodiment, the transmitted diffracted light generated within the transparent substrate satisfies the condition of total reflection, and besides, satisfies the condition of the cancelation, and therefore, the occurrence of the stray light due to leakage of the transmitted diffracted light (s-polarized light) outside the transparent substrate can be sufficiently suppressed. That is, according to the wobbled wire element in the second embodiment, the remarkable effect capable of improving the polarization contrast ratio while suppressing the generation of the stray light leaked outside from the transparent substrate can be obtained.

In view of sufficiently suppressing generation of stray light leaking outside from the transparent substrate, for example, as shown in FIG. 16, note that the phase difference between adjacent wobbled wires in the y direction is desired to be $\pi$ (=180 degrees). However, the wobbled wire element in the second embodiment is not limited to this, and is useful even when other phase difference is provided.

This is because, if other phase difference than $\pi$ (=180 degrees) is provided, the transmitted diffracted light due to each of adjacent wobbled wires cannot completely be cancelled, and partially remains. However, in the second embodiment, the period of the period structure in the y direction is within the range of the condition of $\lambda/n_s$ to $\lambda$, and this range of the condition is almost coincident with the condition causing the transmitted diffracted light to totally reflect. That is, in the wobbled wire element in the second embodiment, even when the transmitted diffracted light (s-polarized light) is generated, it totally reflects, and therefore, the generation of stray light leaked outside from the transparent substrate can be suppressed even when the phase difference between adjacent wobbled wires in the y direction is not π (=180 degrees).

Figure 20:
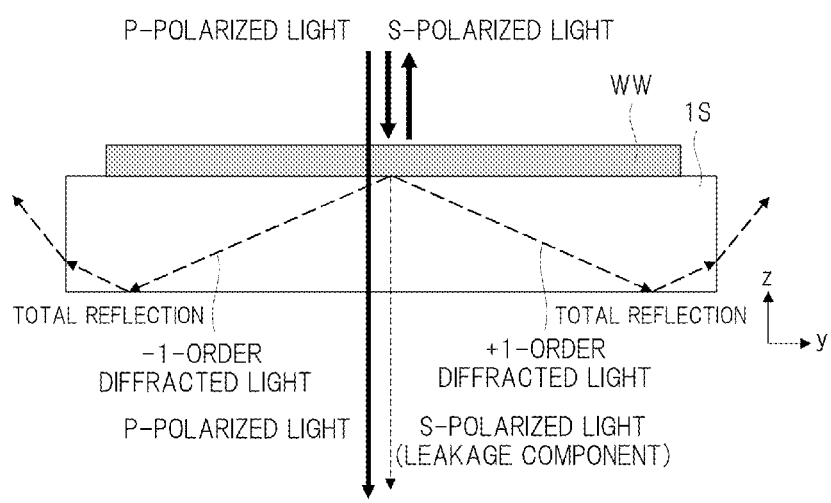
FIG. 20 is a schematic diagram illustrating a state of the generation of transmitted diffracted light under such a condition as obtaining a large polarization contrast ratio.

FIG. 20 is a schematic diagram showing a state of the generation of transmitted diffracted light under the condition that a large polarization contrast ratio can be obtained. In FIG. 20, the wobbled wire element in the second embodiment has a wobble period within a range of $\lambda/n_s$ to $\lambda$. Therefore, the generated transmitted diffracted light (s-polarized light) cannot be emitted from the back surface of the transparent substrate 1S (because the wave number becomes imaginary), and is totally reflected thereon, and consequently is emitted from a side surface of the transparent substrate 1S. Therefore, it can be said that the influence of the transmitted diffracted light in the case of using the wobbled wire element in the second embodiment is not required to be considered as long as the wobbled wire element in the second embodiment is used in a general usage method.

However, when such a fact that the transmitted diffracted light emitted from a side surface of the transparent substrate becomes the stray light becomes a problem, a light absorbing member such as a black coating may be arranged on the side surface of the transparent substrate 1S. In this case, the transmitted diffracted light to be emitted from the side surface of the transparent substrate 1S is mostly absorbed by the light absorbing member, and therefore, the generation of stray light leaked outside from the transparent substrate 1S can be almost completely suppressed.

<Modification Example>

In the wobbled wire element in the second embodiment, for example, as shown in FIG. 16, the example of modulating the width of the wobbled wire in the x direction to be the sine wave shape in the y direction has been described. However, the period structure (modulated structure) of the wobbled wire element is not limited to the sine-wave shaped modulation.

For example, FIG. 21 is a diagram showing an example of modulating the width of the wobbled wire in the x direction to be a square wave shape in the y direction. In FIG. 21, the wobble period is set to 400 nm, and the modulation amplitude (peak to peak) is set to 40 nm. FIG. 21(a) shows the case of the sine-wave shaped modulation for comparison, and the polarization contrast ratio is 3500 in the drawing. On the other hand, FIG. 21(b) shows the case of a square-wave shaped modulation, and the polarization contrast ratio is 8300 in the drawing. Further, FIG. 21(c) shows the case of a corner-rounded square-wave shaped modulation in consideration of manufacturing process, and the polarization contrast ratio is 4600 in the drawing.

For the above-described reason, in the case that the period structure (modulated structure) of the wobbled wire element is modulated into a square wave shape, it is found that the polarization contrast ratio is improved more than that in the case of the sine-wave shaped modulation. That is, also in the wobbled wire element which has been subjected to the square-wave shaped modulation, a polarization contrast ratio largely exceeding the polarization contrast ratio (380) of a conventional wire-grid element can be obtained.

On the other hand, the transmittance Tp of the p-polarized light is 89.2% in the case of sine-wave shaped modulation shown in FIG. 21(a), 87.8% in the case of the square-wave shaped modulation shown in FIG. 21(b), and 88.9% in the case of the corner-rounded square-wave shaped modulation shown in FIG. 21(c). Therefore, it can be said that the sine-wave shaped modulation shown in FIG. 21(a) is superior in the transmittance Tp of the p-polarized light.

FIG. 22 is another modification example of the wobbled wire element. In the wobbled wire element in this modification example, a wobbled wire having the square wave shape is formed by forming circular holes (a diameter of 100 nm) continuously in an aluminum film in consideration of the manufacturing process. In FIG. 22, the wobble period is set to 400 nm, and the modulation amplitude (peak to peak) is set to 40 nm. Note that the number of formed holes per a wobble period is assumed as "N".

FIG. 22(a) shows a wobbled wire element in the case of "N=6". In the wobbled wire element in FIG. 22(a), the transmittance Tp of the p-polarized light is 84.5%, and the polarization contrast ratio is 27500 in the drawing. Next, FIG. 22(b) shows the wobbled wire element in the case of "N=12". In the wobbled wire in FIG. 22(b), the transmittance Tp of the p-polarized light is 87.9%, and the polarization contrast ratio is 6400 in the drawing. Next, FIG. 22(c) shows a wobbled wire element in the case of "N=24". In the wobbled wire element in FIG. 22(c), the transmittance Tp of the p-polarized light is 89.4%, and the polarization contrast ratio is 4200 in the drawing.

For the above-described reason, it is found that all of the wobbled wire elements shown in FIGS. 22(a) to 22(c) can obtain a polarization contrast ratio largely exceeding the polarization contrast ratio (380) of a conventional wire-grid element.

Further, although the polarization contrast ratio is the largest in the wobbled wire element in FIG. 22(a), and the transmittance Tp of the p-polarized light is the smallest therein. That is, as similar to the conventional wire-grid element, it is found that the wobbled wire element also has a trade-off relation with the polarization contrast ratio. Therefore, it goes without saying that it is required to design a suitable element shape to be practically used in consideration of the manufacturing process or others. In the invention of the present application, although the case of the vertical incident of the light wave to the wobbled wire element has been described for simplifying the description, the present invention is not limited to this case, and appropriate attention is required to be paid for the practical use in accordance with the field of application.

Note that the wobbled wire element in the present invention can be manufactured by applying the manufacturing process of a conventional wire-grid element. Specifically, for example, an aluminum film is formed on a transparent substrate by a sputtering method. Then, the aluminum film is patterned by a photolithography technique and an etching technique. By changing this patterning of the aluminum film, the wobbled wire element in the present invention can be formed instead of a conventional wire-grid element.

Further, in the case of manufacturing the wobbled wire elements shown in FIGS. 22(a) to 22(c), the wobbled wire elements can be manufactured by forming an aluminum film on a transparent substrate, and then, irradiating the aluminum film with an electron beam or laser beam so as to form holes continuously.

<Characteristics of the Wobbled Wire Element>

The characteristics of the wobbled wire element of the invention of the present application will be described below.

Figure 23:
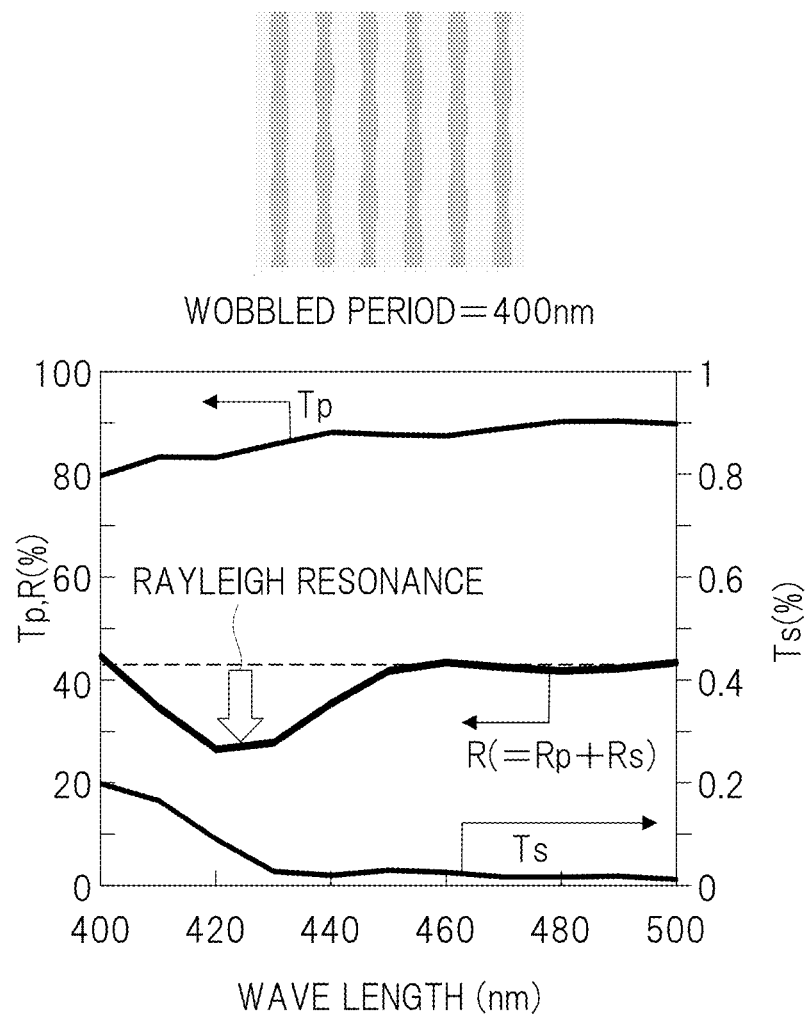
FIG. 23 is a diagram showing the wavelength dependency of incident light in a wobbled wire element.

FIG. 23 is a calculation result showing the wavelength dependency of incident light in the wobbled wire element shown in FIG. 21(a). In FIG. 23, the material of wobbled wires configuring the wobbled wire element is aluminum, the pitch is 150 nm, the width is 50 nm, and the height is 150 nm. Further, the wobble period is 400 nm, and the wobble amplitude (peak to peak) is 40 nm.

As shown in FIG. 23, in the wobbled wire element of the present invention, a transmittance Tp of the p-polarized light of 80% or larger and a transmittance Ts of the s-polarized light of 0.2% or smaller are obtained in a range of wavelength of 400 nm to 500 nm, and therefore, it is found that the wobbled wire element has a good polarized-light separation performance having a polarization contrast ratio of 400 or larger. Particularly, in a range of wavelength of 430 nm or larger, the transmittance Ts of the s-polarized light decreases significantly, and therefore, it is found that an excellent polarization contrast ratio is obtained.

Further, in average reflectance R shown in FIG. 23 (the sum of reflectance Rp of the p-polarized light and reflectance Rs of the s-polarized light, and the main component is Rs), it is also found that the wobbled wire element in the present invention has a minimum value obtained when Rayleigh resonance is reflected to a range of wavelength of 400 nm to 440 nm. Such characteristics of the transmittance Ts of the s-polarized light and the average reflectance R are unique for the wobbled wire element, and cannot be seen in a conventional wire-grid element.

Such features of the wobbled wire element is useful when the wobbled wire element is applied to an optical device represented by a liquid crystal projector. For example, for a liquid crystal projector, in addition to improvement of the polarization contrast ratio, a polarizing element having low reflectance is desired in view of thermal protection of the liquid crystal panel. In this case, as described above, according to the wobbled wire element (polarizing element) in the present invention, the polarization contrast ratio can be improved more, and besides, the reflectance can be reduced as compared with a conventional wire-grid element, and therefore, the wobbled wire element can exert excellent performance when being used in a liquid crystal projector.

Figure 24:
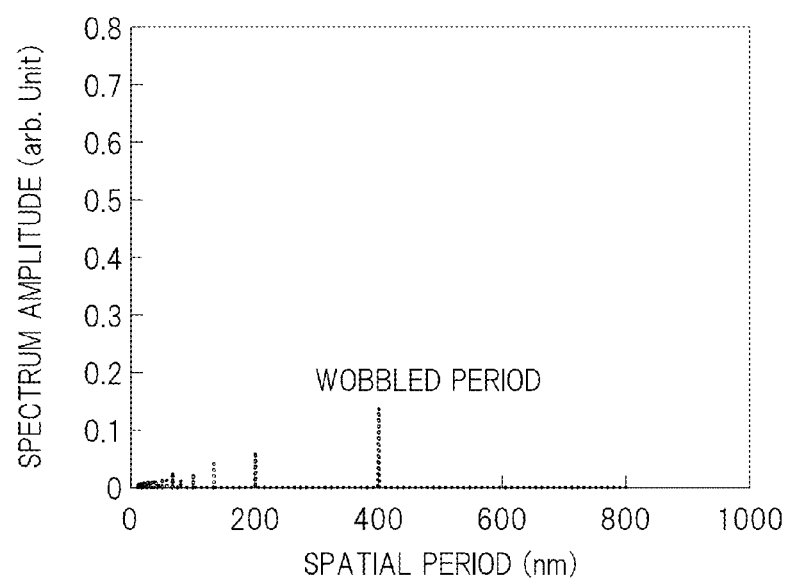
FIG. 24 is a diagram showing the spatial period distribution of a wobbled wire element.

Next, FIG. 24 is a diagram showing a spatial frequency distribution of the wobbled wire element shown in FIG. 21(a). Here, two-dimensional data binarized so that a wobbled wire portion is "1" and a gap (space) portion between wobbled wires is "0" is generated from a calculation model (a mesh size of 1 nm). Then, the generated two-dimensional data is subjected to Fourier transform in the y direction to calculate a spectrum. Note that, in FIG. 24, not a spatial frequency itself but a spatial period (nm) corresponding to an inverse of the spatial frequency is used. In FIG. 24, the vertical axis indicates spectral amplitude while the horizontal axis indicates spatial period (nm). As shown in FIG. 24, it is found that there is a large peak in the wobble period regarding the y direction.

In a practical polarizing element, similar spectral analysis can be performed. For example, two-dimensional data is generated by appropriately binarizing a wobbled wire portion and a gap (space) portion between wobbled wires from a SEM picture of an upper surface of a polarizing element, and then, the two-dimensional data can be separated in the y direction (a longitudinal direction of the wobbled wire) and the x direction (a direction orthogonal to the y direction) and be subjected to Fourier analysis.

In a practical polarizing element, variation of the element shape depending on the manufacturing process, a lack of a metal wire within an acceptable performance range or others occurs. A result of spectral analysis analyzed in consideration of these matters is shown.

FIG. 25 is a diagram showing a result of spectral analysis. In FIG. 25, for simplification, spectral intensity in the y direction is shown. FIG. 25(a) shows a spectrum in the y direction of a conventional grid-wire element. As shown in FIG. 25(a), since a conventional wire-grid element does not have a period structure in the y direction, it is found that there is no peak except for a disordered variation or a defect of a metal wire shape due to the manufacturing process.

FIG. 25(b) shows a spectrum of the wobbled wire element shown in FIG. 21(a). The wobble period of this wobbled wire element is in a first region ($\lambda/n_s$ to $\lambda$), and therefore, this wobbled wire element is here called wobbled wire element (Type-I). The spectrum of this wobbled wire element (Type-I) is a result of combination of the result shown in FIG. 24 and the disordered variation of the metal wire shape depending on the manufacturing process. That is, in the wobbled wire element (Type-I), it is found that the spectrum corresponding to the wobble period exists between $\Lambda$ and $\lambda$.

FIG. 25(c) shows a spectrum of the wobbled wire element of the first embodiment shown in FIG. 12. The wobble period of this wobbled wire element is in a second region ($\lambda$ or larger), and therefore, this wobbled wire element is here called wobbled wire element (Type-II). In the spectrum of this wobbled wire element (Type-II), as shown in FIG. 25(c), it is found that a peak corresponding to the wobble period exists in a position larger than $\lambda$.

By using such a spectral analysis technique, a conventional wire-grid element and the wobbled wire element of the present invention can be distinguished from each other. Note that the wobble amplitude of the wobbled wire element of the present invention can be basically arbitrarily set. However, in view of making the effect of the present invention become obvious, it is desired that the wobble amplitude (peak to peak) be 5% or larger of the average amplitude of the adjacent wobbled wire.

(Third Embodiment)

In the third embodiment, an optical device to which the wobbled wire element in the first embodiment or the second embodiment is applied will be described with reference to the drawings. Particularly, in the third embodiment, a liquid crystal projector that is one of various optical devices is taken as an example for the description.

<Configuration of a Liquid Crystal Projector>

FIG. 26 is a schematic diagram illustrating an optical system of a liquid crystal projector in the third embodiment. In FIG. 26, the liquid crystal projector in the third embodiment has a light source LS, a waveguide optical system LGS, a dichroic mirrors DM(B) and DM(G), reflecting mirrors MR1(R), MR1(B), and MR2(R), wobbled wire elements WWE1(B), WWE1(G), WWE1(R), WWE2(B), WWE2(G), WWE2(R), liquid crystal panels LCP(B), LCP(G), LCP(R), and a projector lens LEN.

The light source LS is configured of a halogen lamp or others, and emits white light containing blue light, green light, and red light. Then, the waveguide optical system is configured so as to perform uniformalization or collimation of a light distribution emitted from the light source LS or others.

The dichroic mirror DM(B) is configured so as to reflect light having a wavelength corresponding to blue light but transmit green light and red light which are other colors. Similarly, the dichroic mirror DM(G) is configured so as to reflect light having a wavelength corresponding to green light and transmitting red light which is other color. Further, the reflecting mirror MR1(R) is configured so as to reflect red light.

The wobbled wire elements WWE1(B), WWE2(B) are configured so that blue light is made incident thereon and specific polarized light is selectively transmitted therethrough, and the wobbled wire elements WWE1(G), WWE2(G) are configured so that green light is made incident thereon and specific polarized light is selectively transmitted therethrough. Further, the wobbled wire elements WWE1(R), WWE2(R) are configured so that red light is made incident thereon and specific polarized light is selectively transmitted therethrough.

Specifically, the wobbled wire elements WWE1(B), WWE1(G), WWE1(R), WWE2(B), WWE2(G), WWE2(R) are the wobbled wire elements described in the first embodiment or the second embodiment, and the wobble period is $\lambda$ or larger in the case, for example, corresponding to the first embodiment. On the other hand, in the case corresponding to the second embodiment, the wobble period is within a range of $\lambda/n_s$ to $\lambda$.

The reflecting mirror MR1(B) is configured so as to reflect blue light, and the reflecting mirror MR1(R) and the reflecting mirror MR2(R) are configured so as to reflect red light.

The liquid crystal panel LCP(B) is configured so that the polarized light emitted from the wobbled wire element WWE1(B) for blue light is made incident thereon and so that intensity modulation of the polarized light is not performed in accordance with image information. Similarly, the liquid crystal panel LCP(G) is configured so that the polarized light emitted from the wobbled wire element WWE1(G) for green light is made incident thereon and so that intensity modulation of the polarized light is performed in accordance with image information, and the liquid crystal panel LCP(R) is configured so that the polarized light emitted from the wobbled wire element WWE1(R) for red light is made incident thereon and so that intensity modulation of the polarized light is performed in accordance with image information. The liquid crystal panels LCP(B), LCP(G), LCP(R) are electrically connected to a control circuit (not shown) that controls the liquid crystal panels, and voltage applied to the liquid crystal panels is controlled based on a control signal from this control circuit. Note that the projector lens LEN is a lens for projecting an image.

<Operation of the Liquid Crystal Projector>

The liquid crystal projector in the third embodiment is configured as described above, and the operation thereof will be described below. First, as shown in FIG. 26, white light containing blue light, green light, and red light is emitted from the light source LS configured of a halogen lamp or others. And, the white light emitted from the light source LS is made incident on the waveguide optical system LGS, so that uniformalization or collimation of a light distribution is performed on the white light. Then, the white light emitted from the waveguide optical system LGS is made incident on the dichroic mirror DM(B) first. Only the blue light contained in the white light is reflected on the dichroic mirror DM(B), and the green light and the red light are transmitted through the dichroic mirror DM(B).

The green light and red light transmitted through the dichroic mirror DM(B) is made incident on the dichroic mirror DM(G). Only the green light is reflected on the dichroic mirror DM(G), and the red light is transmitted through the dichroic mirror DM(G). In this manner, the blue light, the green light, and the red light can be separated from the white light.

Next, the separated blue light is made incident on the wobbled wire element WWE1(B) via the reflecting mirror MR1(B), and specific polarized light contained in the blue light is selectively transmitted. Then, the selectively-transmitted polarized light is made incident on the liquid crystal panel LCP(B). In the liquid crystal panel LCP(B), intensity modulation of the incident polarized light is performed based on a control signal. Then, the intensity-modulated polarized light is emitted from the liquid crystal panel LCP(B), and is made incident on the wobbled wire element WWE2(B), and then, is emitted from the wobbled wire element WWE2(B).

Similarly, the separated green light is made incident on the wobbled wire element WWE1(G), and specific polarized light contained in the green light is selectively transmitted. And, the selectively-transmitted polarized light is made incident on the liquid crystal panel LCP(G). In the liquid crystal panel LCP(G), intensity modulation of the incident polarized light is performed based on a control signal. Then, the intensity-modulated polarized light is emitted from the liquid crystal panel LCP(G), and is made incident on the wobbled wire element WWE2(G), and then, is emitted from the wobbled wire element WWE2(G).

Further, the separated red light is made incident on the wobbled wire element WWE1(R) via the reflecting mirror MR1(R) and the reflecting mirror MR2(R), and specific polarized light contained in the red light is selectively transmitted. And, the selectively-transmitted polarized light is made incident on the liquid crystal panel LCP(R). In the liquid crystal panel LCP(R), intensity modulation of the incident polarized light is performed based on a control signal. Then, the intensity-modulated polarized light is emitted from the liquid crystal panel LCP(R), and is made incident on the wobbled wire element WWE2(R), and then, is emitted from the wobbled wire element WWE2(R).

Then, the polarized light (blue light) emitted from the wobbled wire element WWE2(B), the polarized light (green light) emitted from the wobbled wire element WWE2(G), and the polarized light (red light) emitted from the wobbled wire element WWE2(R) are multiplexed, and are projected on a screen (not shown) via the projector lens LEN. In this manner, according to the liquid crystal projector in the third embodiment, an image can be projected.

According to the third embodiment, since the wobbled wire element is used in place of a conventional wire-grid element, a liquid crystal projector having an improved contrast ratio can be achieved. In other words, according to the third embodiment, the image quality of a liquid crystal projector can be improved.

In the foregoing, the invention made by the present inventors has been concretely described based on the embodiments. However, it is needless to say that the present invention is not limited to the foregoing embodiments and various modifications and alterations can be made within the scope of the present invention.

For example, in the above-described embodiments, an optical element or an optical device adapted from visible light to near-infrared light has been described, but the present invention is not limited to this. The technical idea of the invention of the present application is similarly applicable to electromagnetic waves as long as the electromagnetic waves follow the Maxwell's equations. Specifically, in a radio-wave device with 77 GHz, the wavelength of an electromagnetic wave (light) is about 4 mm, and, for example, the wobbled wire element is also applicable to such an electromagnetic wave as an optical component (polarizer).

SYMBOL EXPLANATION 1S transparent substrate
DM(B) dichroic mirror
DM(G) dichroic mirror
DM(R) dichroic mirror
LCP liquid crystal panel
LCP(B) liquid crystal panel LCP(G) liquid crystal panel
LCP(R) liquid crystal panel
LEN projector lens
LEN1 lens
LGS waveguide optical system
LS light source
MR1(B) reflecting mirror
MR1(R) reflecting mirror
MR2(R) reflecting mirror
$p_0$ pitch
W width
WA wobbled amplitude
WG wire grid
WP wobbled period
WW wobbled wire
WWE1(B) wobbled wire element
WWE1(G) wobbled wire element
WWE1(R) wobbled wire element
WWE2(B) wobbled wire element
WWE2(G) wobbled wire element
WWE2(R) wobbled wire element
$\Delta\phi$ phase difference

What is claimed is:

1. An optical element comprising:
   (a) a transparent substrate transparent to an incident electromagnetic wave; and
   (b) a plurality of metal wires formed on a main surface of the transparent substrate and arranged at a first periodic interval in a first direction,
   wherein each of the plurality of metal wires extends while having a periodic structure in a second direction orthogonal to the first direction, and,
   when a wavelength of the electromagnetic wave is assumed to "$\lambda$" and a refractive index of the transparent substrate is assumed to "n",
   a period of the periodic structure is $\lambda/n$ or larger,
   wherein the period of the periodic structure is smaller than the wavelength of the electromagnetic wave, and
   wherein in the periodic structure, a center position of a width of each of the plurality of metal wires in the first direction is constant, and the width thereof in the first direction is periodically modulated in the second direction.

2. The optical element according to claim 1,
   wherein the width thereof in the first direction is modulated into a sine wave shape in the second direction.

3. The optical element according to claim 1,
   wherein the width thereof in the first direction is modulated into a square shape in the second direction.

4. The optical element according to claim 1,
   wherein a difference between a phase of the periodic structure in a predetermine metal wire of the plurality of metal wires and a phase of the periodic structure in a metal wire adjacent to the predetermined metal wire is 180 degrees.

5. The optical element according to claim 1,
   wherein an absorbing member for absorbing the electromagnetic wave is provided on a side surface of the transparent substrate.

6. The optical element according to claim 1,
   wherein the electromagnetic wave is visible light.

7. The optical element according to claim 6,
   wherein each of the plurality of metal wires is formed of an aluminum film.

8. An optical device comprising:
   (a) a light source;
   (b) a first polarizing element which selectively transmits specific polarized light from light emitted from the light source;
   (c) a liquid crystal panel on which the polarized light emitted from the first polarizing element is made incident and which performs intensity modulation on the polarized light in accordance with image information;
   (d) a second polarizing element on which the polarized light emitted from the liquid crystal panel is made incident; and
   (e) a projector lens on which the polarized light emitted from the second polarizing element is made incident and which projects an image, and
   each of the first polarizing element and the second polarizing element including:
   (f) a transparent substrate transparent to an incident light; and
   (g) a plurality of metal wires formed on a main surface of the transparent substrate and arranged at a first periodic interval in a first direction,
   wherein each of the plurality of metal wires extends while having a periodic structure in a second direction orthogonal to the first direction, and,
   when a wavelength of the incident light is assumed to "$\lambda$" and a refractive index of the transparent substrate is assumed to "n",
   a period of the periodic structure is $\lambda/n$ or larger,
   wherein the period of the periodic structure is smaller than the wavelength of the electromagnetic wave, and
   wherein in the periodic structure, a center position of a width of each of the plurality of metal wires in the first direction is constant, and the width thereof in the first direction is periodically modulated in the second direction.

* * * * *